(12) United States Patent
Hayasaki et al.

(10) Patent No.: US 10,525,666 B2
(45) Date of Patent: Jan. 7, 2020

(54) OPTICAL LAMINATE STRUCTURE AND HEAD-UP DISPLAY SYSTEM USING THE OPTICAL LAMINATE STRUCTURE, AND LIGHT REFLECTION FILM

(71) Applicant: NIPPON KAYAKU KABUSHIKI KAISHA, Tokyo (JP)

(72) Inventors: Tomoyuki Hayasaki, Tokyo (JP); Hitoshi Asami, Tokyo (JP); Yoshiyuki Yahagi, Tokyo (JP); Chihiro Takahashi, Tokyo (JP); Kouichi Tanaka, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/150,974

(22) Filed: Oct. 3, 2018

(65) Prior Publication Data

US 2019/0030856 A1    Jan. 31, 2019

Related U.S. Application Data

(63) Continuation of application No. PCT/JP2017/014468, filed on Apr. 7, 2017.

(30) Foreign Application Priority Data

Apr. 8, 2016 (JP) .................................. 2016-078343

(51) Int. Cl.
*B32B 7/02* (2019.01)
*B32B 27/30* (2006.01)
(Continued)

(52) U.S. Cl.
CPC ............... *B32B 7/02* (2013.01); *B32B 27/30* (2013.01); *B60K 35/00* (2013.01); *G02B 5/26* (2013.01);
(Continued)

(58) Field of Classification Search
CPC ....................................................... B32B 7/02
(Continued)

(56) References Cited

U.S. PATENT DOCUMENTS 7,492,516 B2   2/2009   Takahashi et al.
7,630,134 B2   12/2009  Takahashi et al.
(Continued)

FOREIGN PATENT DOCUMENTS

EP   1865361 A1   12/2007
EP   3206058 A1   8/2017
(Continued)

OTHER PUBLICATIONS

English Translation of Written Opinion for corresponding International Application No. PCT/JP2017/014468 dated Jul. 4, 2017.
(Continued)

*Primary Examiner* — Tahseen Khan
(74) *Attorney, Agent, or Firm* — Pearne & Gordon LLP

(57) ABSTRACT

An optical laminate structure includes a light control laminate having at least one light reflection layer, a first quarter wave plate laminated on one of surfaces of the light reflection layer, and a second quarter wave plate laminated on another surface of the light reflection layer. The light reflection layer includes a right-handed circularly polarized light reflection layer or a left-handed circularly polarized light reflection layer, and an angle formed by a polarization axis of the S-polarized light or P-polarized light incident from a position inclined from an axis perpendicular to a surface of the light control laminate by 45° or more and 65° or less and a slow axis of the first quarter wave plate on a side to which the S-polarized light or P-polarized light is incident is 5° or more and less than 45°.

20 Claims, 11 Drawing Sheets

(51) Int. Cl.
  *B60K 35/00* (2006.01)
  *G02B 5/26* (2006.01)
  *G02B 5/30* (2006.01)
  *G02B 27/01* (2006.01)
  *G02B 27/28* (2006.01)

(52) U.S. Cl.
  CPC ............ *G02B 5/30* (2013.01); *G02B 5/3066* (2013.01); *G02B 27/01* (2013.01); *G02B 27/0101* (2013.01); *G02B 27/286* (2013.01)

(58) Field of Classification Search
  USPC ........................................................ 428/212
  See application file for complete search history.

(56) References Cited

U.S. PATENT DOCUMENTS

| | | | |
|---|---|---|---|
| 7,633,678 | B2 | 12/2009 | Takahashi et al. |
| 2004/0263736 | A1 | 12/2004 | Graham et al. |
| 2005/0057804 | A1 | 3/2005 | Umeya et al. |
| 2005/0078245 | A1 | 4/2005 | Sasaki et al. |
| 2005/0152031 | A1 | 7/2005 | Umeya |
| 2006/0262401 | A1 | 11/2006 | Takahashi et al. |
| 2009/0128905 | A1 | 5/2009 | Takahashi et al. |
| 2009/0128907 | A1 | 5/2009 | Takahashi et al. |
| 2009/0237789 | A1 | 9/2009 | Ono et al. |
| 2012/0003402 | A1* | 1/2012 | Ohashi ............... B32B 7/12 428/1.1 |
| 2013/0083276 | A1* | 4/2013 | Iwahashi ............. B41M 3/06 349/117 |
| 2014/0307176 | A1* | 10/2014 | Neumann .......... G02B 27/0149 349/11 |
| 2015/0002010 | A1* | 1/2015 | Lee ................... G02B 5/3083 313/112 |
| 2016/0091756 | A1 | 3/2016 | Watano et al. |
| 2016/0170114 | A1 | 6/2016 | Watano et al. |
| 2017/0235030 | A1* | 8/2017 | Tanaka ............... G02F 1/1335 349/11 |
| 2019/0033498 | A1* | 1/2019 | Tanaka ............... G02F 1/1333 |

FOREIGN PATENT DOCUMENTS

| | | |
|---|---|---|
| JP | 11-249061 A | 9/1999 |
| JP | 11-249062 A | 9/1999 |
| JP | 11-281916 A | 10/1999 |
| JP | 2000-028957 A | 1/2000 |
| JP | 2002-090743 A | 3/2002 |
| JP | 2002-179668 A | 6/2002 |
| JP | 2003-315556 A | 11/2003 |
| JP | 2004-029824 A | 1/2004 |
| JP | 2004-318060 A | 11/2004 |
| JP | 2005-055887 A | 3/2005 |
| JP | 2005-128500 A | 5/2005 |
| JP | 2015-194675 A | 11/2015 |
| JP | 5973109 B | 7/2016 |
| WO | 2016/056617 A1 | 4/2016 |
| WO | WO-2016056617 A1 * | 4/2016 ............ G02F 1/1335 |

OTHER PUBLICATIONS

International Preliminary Report on Patentability for corresponding International Application No. PCT/JP2017/014468 dated Oct. 9, 2018.
International Search Report for corresponding International Application No. PCT/JP2017/014468 dated Jul. 4, 2017.
Written Opinion for corresponding International Application No. PCT/JP2017/014468 dated Jun. 13, 2017.
Extended European Search Report dated Nov. 13, 2019 for corresponding European Application No. 17779230.6.

* cited by examiner

OPTICAL LAMINATE STRUCTURE AND HEAD-UP DISPLAY SYSTEM USING THE OPTICAL LAMINATE STRUCTURE, AND LIGHT REFLECTION FILM

CROSS REFERENCE TO RELATED APPLICATIONS

This is a continuation application of International Patent Application No. PCT/JP2017/014468 filed Apr. 7, 2017, which claims the benefit of Japanese Patent Application No. 2016-078343 filed Apr. 8, 2016, the full contents of all of which are hereby incorporated by reference in their entirety.

BACKGROUND

Technical Field

The present disclosure relates to an optical laminate structure exhibiting excellent polarization conversion performance and a head-up display system using the same, and a light reflection film.

Description of the Related Art

As a method for displaying information to an operator of an automobile, an aircraft and the like, a navigation system, a head-up display (hereinafter, also referred to as a HUD) and the like are used. The HUD system is a system for projecting an image projected from image projecting units such as a liquid crystal display (hereinafter, referred to as an LCD) to a windshield of an automobile or the like, for example.

Display light projected from the image displaying units is reflected by a reflection mirror and is further reflected by the windshield and then, reaches an observer. The observer sees a display image projected on the windshield, but the display image looks as if it is at an image position farther than the windshield as a virtual image. In this method, since the driver can obtain various types of information while rarely moving the visual line in a state of gazing toward a front of the windshield, it is safer than a conventional car navigation which requires the visual line to be moved.

The HUD projects display information superimposed on a scene actually seen from the windshield and thus, an image which is bright and easy to be seen is preferably displayed without shielding a visual field. For that purpose, such transmissivity that a foreground is sufficiently seen and such reflectivity that a reflected image of the HUD can be seen sufficiently need to be both included. However, the transmittance and the reflectance are usually in a relationship of trade-off, and there has been a problem that if one is made higher, the other is made lower.

Particularly, in the case of the windshield for automobile, there is a legal restriction that visible light transmittance in a perpendicular direction to the glass is 70% or more and thus, it is difficult to apply a member having high reflectance to the windshield. In order to cope with such a problem, Japanese Patent No. 5973109 discloses a light control film in which a light reflection film made by using a cholesteric liquid crystal layer is sandwiched by two pieces of quarter wave plates as units for reflecting light, for example. Japanese Patent No. 5973109 discloses that visibility of the display image can be improved by arranging functional glass made by using such the light control film as the windshield for automobile in the HUD.

The quarter wave plate is known to have an effect of converting incident linearly polarized light to circularly polarized light or incident circularly polarized light to linearly polarized light. When the light control film sandwiched by these two pieces of quarter wave plates is to be arranged on the windshield of the HUD, it is preferable that the linearly polarized light of P-polarized light or S-polarized light is converted to the circularly polarized light as efficiently as possible, and the circularly polarized light incident to the quarter wave plate on a vehicle outer side through the cholesteric liquid crystal layer is converted to the linearly polarized light of P-polarized light or S-polarized light as efficiently as possible. Thus, it is preferable that the light control film has excellent polarization conversion performance capable of returning the incident P-polarized light or S-polarized light to the original S-polarized light or P-polarized light more efficiently. Japanese Patent No. 5973109 does not refer to a degree of the polarization conversion performance of the light control film.

SUMMARY

The present disclosure is related to providing an optical laminate structure exhibiting excellent polarization conversion performance capable of returning incident S-polarized light or P-polarized light to original S-polarized light or P-polarized light more efficiently and a head-up display using this.

According to a first aspect of the present disclosure, an optical laminate structure includes a light control laminate having at least one light reflection layer, a first quarter wave plate laminated on one of surfaces of the light reflection layer, and a second quarter wave plate laminated on another surface of the light reflection layer. The light reflection layer includes a right-handed circularly polarized light reflection layer or a left-handed circularly polarized light reflection layer, and an angle formed by a polarization axis of S-polarized light or P-polarized light incident from a position inclined from an axis perpendicular to a surface of the light control laminate by 45° or more and 65° or less and a slow axis of the first quarter wave plate on a side to which the S-polarized light or P-polarized light is incident is 5° or more and less than 45°.

Further, it is preferable that an angle θ formed by the slow axis of the first quarter wave plate and the polarization axis of S-polarized light or P-polarized light incident to the light control laminate at an arbitrary incident angle satisfies the following formulas (1) and (2); and an angle formed by the slow axis of the second quarter wave plate and the polarization axis of S-polarized light or P-polarized light incident to the light control laminate at an arbitrary incident angle is −θ:

$$\tan\theta = \cos\beta \tag{1}$$

$$\beta = \sin^{-1}\left(\sin\alpha \cdot \frac{n_\alpha}{n_\beta}\right) \tag{2}$$

θ: an angle formed by the slow axis of the first quarter wave plate and the polarization axis of S-polarized light or P-polarized light incident to the light control laminate at an arbitrary incident angle α

α: an incident angle of S-polarized light or P-polarized light to the light control laminate $n_\alpha$: refractive index of air $n_\beta$: refractive index of first quarter wave plate Further, it is preferable that at least one of the first quarter wave plate and second quarter wave plate includes a polymerizable liquid crystal layer.

Further, it is preferable that the at least one of the right-handed circularly polarized light reflection layer and the left-handed circularly polarized light reflection layer is a cholesteric liquid crystal layer having fixed helical orientation.

Further, it is preferable that at least two or more light reflection layers having the cholesteric liquid crystal layer and having center reflection wavelengths different from each other are laminated; the at least two or more light reflection layers which are laminated include at least one light reflection layer among a light reflection layer PRL-1 having a center reflection wavelength of 400 nm or more and less than 500 nm and having reflectance to ordinary light at the center reflection wavelength of 5% or more and 25% or less, a light reflection layer PRL-2 having a center reflection wavelength of 500 nm or more and less than 600 nm and having reflectance to ordinary light at the center reflection wavelength of 5% or more and 25% or less, and a light reflection layer PRL-3 having a center reflection wavelength of 600 nm or more and less than 700 nm and having reflectance to ordinary light at the center reflection wavelength of 5% or more and 25% or less; and each of the at least two or more light reflection layers has a characteristic of reflecting polarized light in the same direction.

Further, it is preferable that the at least two or more light reflection layers include two or three light reflection layers among the light reflection layer PRL-1, the light reflection layer PRL-2, and the light reflection layer PRL-3.

Further, it is preferable that the at least two or more light reflection layers include a light reflection layer PRL-4 having a center reflection wavelength of 700 nm or more and less than 950 nm or less and having reflectance to ordinary light at the center reflection wavelength of 5% or more and 25% or less; and the light reflection layer PRL-4 has a characteristic of reflecting polarized light in the same direction as the light reflection layer PRL-1, the light reflection layer PRL-2, and the light reflection layer PRL-3.

Further, it is preferable that a full width at half maximum of a reflection spectrum of each of the light reflection layers is 100 nm or more and 500 nm or less.

Further, it is preferable that an angle formed by the slow axis of the first quarter wave plate and the polarization axis of S-polarized light or P-polarized light incident to the light control laminate at an arbitrary incident angle is within a range from 5° to θ; and an angle formed by the slow axis of the second quarter wave plate and the polarization axis of S-polarized light or P-polarized light incident to the light control laminate at an arbitrary incident angle is within a range from −θ to −5°.

Further, it is preferable that the light control laminate includes an optical laminate in which a block layer is laminated on one surface or both surfaces of the light reflection layer.

Further, it is preferable that a material for forming the block layer is a resin having a glass transition temperature of 80° C. or more and 300° C. or less.

Further, it is preferable that the block layer is a cured film obtained by curing an ultraviolet curable resin composition, thermally curable resin composition or a mixture of them.

Further, it is preferable that the ultraviolet curable resin composition includes one or more of ultraviolet curable resins selected from a group consisting of polyfunctional (meth)acrylate, polyfunctional urethane (meth)acrylate, polyfunctional epoxy (meth)acrylate, polyfunctional polyester (meth)acrylate and polyfunctional tris(acryloxyethyl) isocyanurate.

Further, it is preferable that the light control laminate is a laminate for laminated glass made by laminating at least one intermediate film.

Further, it is preferable that the light control laminate is the laminate for laminated glass in which two pieces of the intermediate films are laminated so as to sandwich the first quarter wave plate and the second quarter wave plate.

Further, it is preferable that at least one of the intermediate films is polyvinyl butyral resin.

Further, it is preferable that the light control laminate is a functional glass in which the first quarter wave plate and the second quarter wave plate are sandwiched by two pieces of glass plates.

According to a second aspect of the present disclosure, a head-up display system contains the optical laminate structure according to the present disclosure and a display projecting display light showing a display image as S-polarized light or P-polarized light.

Further, it is preferable that the display light projected from the display is P-polarized light, and an incident angle of the P-polarized light incident to the optical laminate structure is within a range from α−10° to α+10°, where α is a Brewster's angle of the P-polarized light to the optical laminate structure according to the present disclosure.

According to a third aspect of the present disclosure, a light reflection film includes an optical laminate in which at least one light reflection layer and a block layer laminated on one surface or both surfaces of the light reflection layer. The light reflection layer includes a cholesteric liquid crystal layer and is laminated on a plastic substrate, and the block layer is laminated at least on the cholesteric liquid crystal layer side of the light reflection layer.

The present disclosure can provide an optical laminate structure exhibiting excellent polarization conversion performance capable of returning the incident S-polarized light or P-polarized light to the original S-polarized light or P-polarized light more efficiently and a head-up display using this.

DETAILED DESCRIPTION

Figure 1:
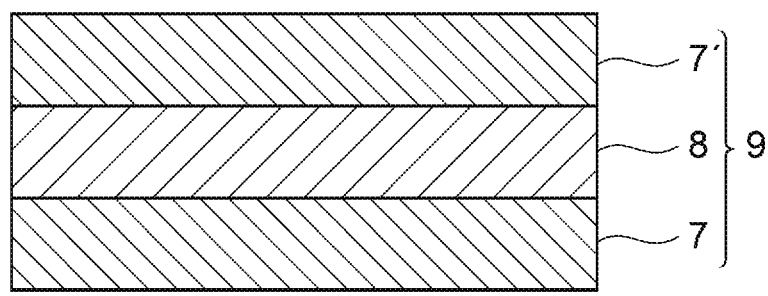
FIG. 1 A side sectional view illustrating an embodiment of an optical laminate structure according to the present disclosure.

Embodiments according to the present disclosure will be described below by referring to the drawings. In the following embodiments, some typical embodiments of the present disclosure are only exemplified, and various changes can be applied within a range of the present disclosure. Moreover, "PRL" here is abbreviation of Polarized light Reflection Layer and is alphabetical notation meaning a light reflection layer.

<Optical Laminate Structure>

An optical laminate structure according to the present disclosure includes a light control laminate having at least one light reflection layer, a first quarter wave plate laminated on one of surfaces of the light reflection layer, and a second quarter wave plate laminated on another surface of the light reflection layer. FIG. 1 illustrates an embodiment of the optical laminate structure according to the present disclosure. The optical laminate structure 100 illustrated in FIG. 1 constitutes the light control laminate 9 in which the first quarter wave plate 7 and the second quarter wave plate 7' are laminated on both surfaces of the light reflection layer 8. As a method of laminating the first quarter wave plate 7 and the second quarter wave plate 7' on the light reflection layer 8, a method of lamination by using a bonding agent or an adhesive agent, a method of directly laminating the light reflection layer 8 on the first quarter wave plate 7 and then, of directly laminating the second quarter wave plate 7' on the light reflection layer 8, a method of forming a film of a photo-orientation material exhibiting photo-orientation characteristics by polarized radiation on a surface of the light reflection layer 8, the first quarter wave plate 7 or the second quarter wave plate 7' and of directly laminating the light reflection layer 8, the first quarter wave plate 7 or the second quarter wave plate 7' on which a photo-orientation layer subjected to orientation processing such as polarized radiation and the like is formed can be cited. Among these methods, the method of directly laminating the first quarter wave plate 7, the light reflection layer 8, and the second quarter wave plate 7', respectively, is preferable from a viewpoint of costs.

(Light Control Laminate)

Figure 2:
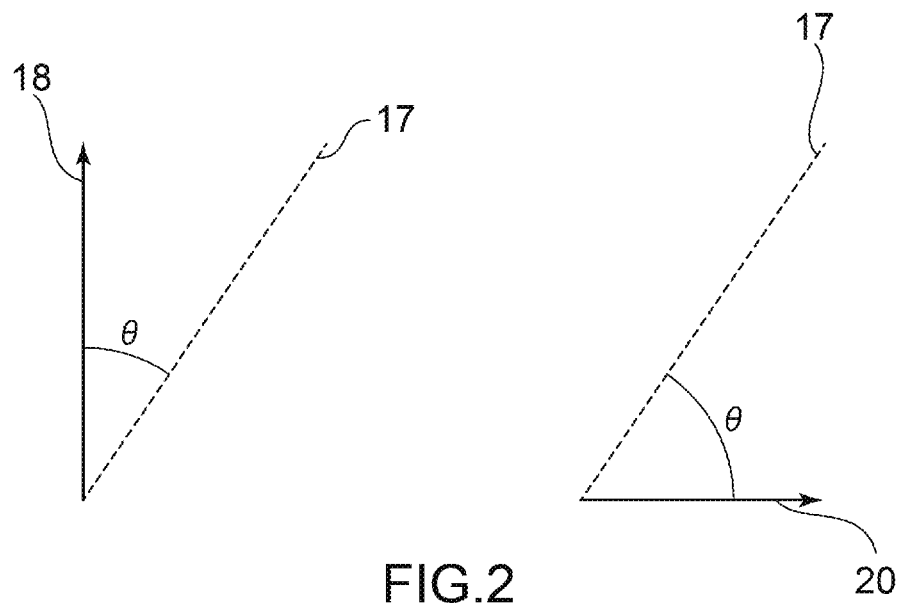
FIG. 2 A schematic view illustrating an angle θ formed by a slow axis of a first quarter wave plate and a polarization axis of S-polarized light or P-polarized light incident to the optical laminate structure at an arbitrary incident angle.

The light control laminate used in the present disclosure has, as illustrated in FIG. 1, the light reflection layer 8, the first quarter wave plate 7 laminated on the one surface of the light reflection layer 8, and the second quarter wave plate 7' laminated on the other surface of the light reflection layer 8. In the two pieces of the quarter wave plates, the first quarter wave plate 7 is provided on a side to which the S-polarized light or P-polarized light is incident, and the second quarter wave plate 7' is provided on a side to which circularly polarized light transmitted through the light reflection layer is incident. In order to convert the incident S-polarized light or P-polarized light to original S-polarized light or P-polarized light more efficiently, the light control laminate controls an angle θ formed by a polarization axis 18 of P-polarized light or a polarization axis 20 of S-polarized light incident from a position inclined by 45° or more and 65° or less, preferably by 50° or more and 60° or less from an axis perpendicular to a surface of the light control laminate and a slow axis 17 of the first quarter wave plate to 5° or more and less than 45° as illustrated in FIG. 2. By setting the incident angle of the S-polarized light or P-polarized light incident to the light control laminate within a range of 45° or more and 65° or less, when the P-polarized light is incident to the light control laminate, for example, reflectance on the surface of the light control laminate can be suppressed to 2% or less theoretically. In a specific example, if the light reflection layer has a right-handed circularly polarized light reflection function, when the P-polarized light is incident to the light control laminate at the aforementioned incident angle, the P-polarized light is hardly reflected on an interface of the light control laminate and is transmitted through the first quarter wave plate. The transmitted P-polarized light is converted to the right-handed circularly polarized light by the first quarter wave plate, and in this right-handed circularly polarized light, a part of the right-handed circularly polarized light is reflected by the light reflection layer by the right-handed circularly polarized light conversion performance of the right reflection layer. The reflected right-handed circularly polarized light is converted again to the original P-polarized light by the first quarter wave plate, and this P-polarized light reaches an observer. Moreover, the right-handed circularly polarized light which is not reflected by the light reflection layer but transmitted through the light reflection layer is returned to the original P-polarized light by the second quarter wave plate, but this P-polarized light is hardly reflected on the interface on an outer side of the second quarter wave plate but is transmitted. Moreover, if the S-polarized light is incident to the light control laminate within the aforementioned range of the incident angle, for example, the S-polarized light is reflected on the surface of the light control laminate, and this S-polarized light reaches the observer. The S-polarized light which is not reflected by the first quarter wave plate but transmitted through the first quarter wave plate is converted to the left-handed circularly polarized light by the first quarter wave plate. This left-handed circularly polarized light is not reflected by the light reflection layer having the right-handed circularly polarized light reflection function but is transmitted through the light reflection layer and is returned to the original S-polarized light by the second quarter wave plate, but this S-polarized light is also hardly reflected on the interface on the outer side of the second quarter wave plate but is transmitted. As described above, by controlling the incident angle of the S-polarized light or P-polarized light incident to the light control laminate, double reflection is suppressed and as a result, occurrence of a double image can be suppressed. Moreover, if an upper limit value of the angle θ is 45° or more, the polarization conversion performance for converting the P-polarized light or S-polarized light incident to the light control laminate to the original P-polarized light or S-polarized light is low and as a result, there is a concern that a display image on the display becomes dark. On the other hand, though a lower limit value of the angle θ can be adjusted to 0° theoretically, approximately 5° is practically a limit and thus, the lower limit value of the angle θ is controlled to 5° or more. By appropriately controlling this angle θ, the optical laminate structure according to the present disclosure shows excellent polarization conversion performance and as a result, the display image can be visually recognized extremely clearly.

Figure 3:
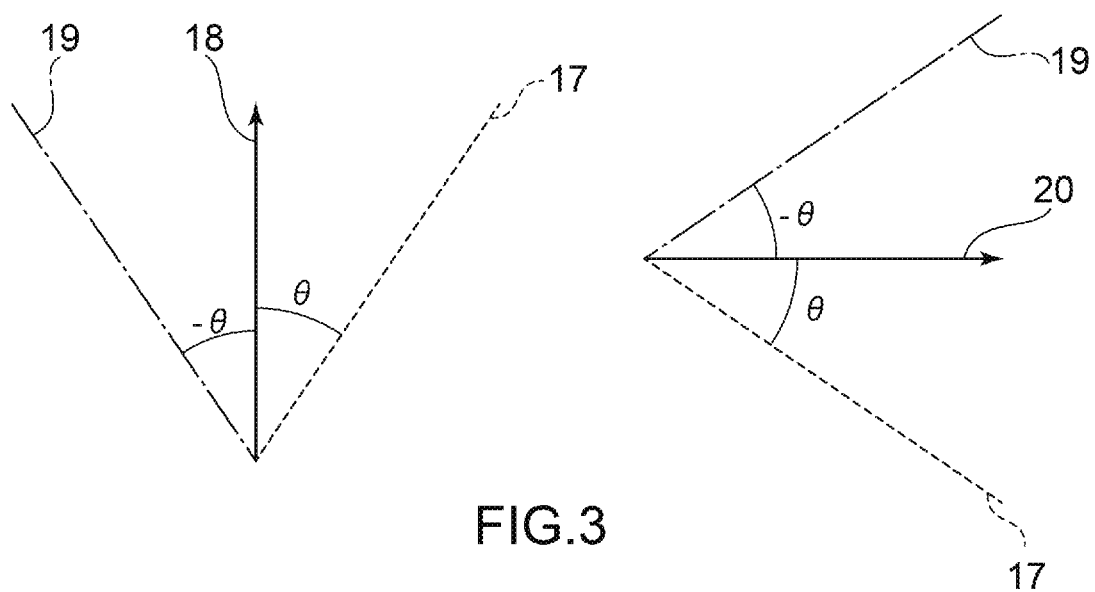
FIG. 3 A schematic view illustrating angles θ and −θ formed by the slow axis of the quarter wave plate and a polarization axis of S-polarized light or P-polarized light incident at an arbitrary incident angle.

In order to control the polarization conversion performance exhibited by the optical laminate structure more appropriately, as illustrated in FIG. 3, in the light control laminate used in the present disclosure, it is preferable that the angle θ formed by the slow axis 17 of the first quarter wave plate in the two pieces of the quarter wave plates and the polarization axis 20 of the S-polarized light or the polarization axis 18 of the P-polarized light incident to the light control laminate at an arbitrary angle satisfies the following formulas (1) and (2) and that the angle formed by the slow axis of the second quarter wave plate and the polarization axis 20 of the S-polarized light or the polarization axis 18 of the P-polarized light incident to the light control laminate at an arbitrary incident angle is −θ. Here, technical meanings of the following formulas (1) and (2) are as follows. When the S-polarized light or P-polarized light incident to the light control laminate passes through the first quarter wave plate which is a medium having a refractive index different from that of the air, the incident angle incident to the first quarter wave plate is change. Here, assuming that the incident angle of the S-polarized light or P-polarized light to the light control laminate is α, the incident angle actually incident to the first quarter wave plate, that is, a refractive angle of the first quarter wave plate is β, the refractive index of the air is $n_\alpha$, and the refractive index of the first quarter wave plate is $n_\beta$, $\sin\alpha/\sin\beta = n_\beta/n_\alpha$ is established in accordance with Snell's law, and when this formula is simplified to an equation which can acquire β, the formula (2) is derived. On the other hand, if a phase difference value is Re, assuming that the polarization axis of the S-polarized light incident to the light control laminate is an x-axis, the polarization axis of the P-polarized light is a y-axis, and an angle formed by the y-axis and the slow axis of the first quarter wave plate is θ, the y-axis is expressed by Re·cos θ, and the x-axis is expressed by Re·sin θ in accordance with vector analysis. Here, the polarization conversion performance of the quarter wave plate is known to be optimal when the light is incident at 45° with respect to the slow axis of the quarter wave plate and thus, the incident angle to the slow axis of the first quarter wave plate is preferably 45° theoretically. That is, the action of the first quarter wave plate for converting the P-polarized light or S-polarized light to the right-handed circularly polarized light or left-handed circularly polarized light can be made optimal when the incident angle to the slow axis of the first quarter wave plate is 45°. However, such an action can be changed by the angle of incidence to the quarter wave plate and inclination of the quarter wave plate. That is considered to be based on that, even if the angle formed by the polarization axis of S-polarized light or P-polarized light incident to the light control laminate and the slow axis of the first quarter wave plate is θ, the angle incident to the first quarter polarization plate is actually β as described above.

Thus, when the y-axis (actual y-axis) at inclination around the x-axis at the angle β is acquired for the y-axis (theoretical y-axis) of Re·cos θ, Re·cos θ/actual y-axis=sin(90°−β) is established, and the actual y-axis is expressed by Re·cos θ cos β. As described above, it is preferable that the incident angle to the slow axis of the quarter wave plate is 45°. In order to have the angle formed by the polarization axis of the S-polarized light or P-polarized light incident to the first quarter wave plate and the slow axis of the quarter wave plate to be 45°, the x-axis (Re·sin θ) and the actual y-axis (Re·cos θ cos β) need to be equal and thus, Re·sin θ=Re·cos θ cos β is acquired, and by simplifying this equation, the formula (1) is derived. That is, the angle θ acquired from the formulas (1) and (2) is designed so that the polarization conversion performance of the first quarter wave plate has the optimal incident angle 45°, even if the inclination of the first quarter wave plate is 65°, for example. Moreover, in the second quarter wave plate, the action of returning the right-handed circularly polarized light or left-handed circularly polarized light transmitted through the light reflection layer to the original P-polarized light or S-polarized light can be made optimal when the slow axis of the first quarter wave plate is orthogonal to the slow axis of the second quarter wave plate, that is, when the incident angle to the slow axis of the second quarter wave plate is −45°. Therefore, the angle formed by the slow axis of the second quarter wave plate and the polarization axis 20 of the S-polarized light or the polarization axis 18 of the P-polarized light incident to the light control laminate at an arbitrary incident angle is controlled to −θ. As described above, by strictly controlling the angle θ in a relationship with the angle β at which the P-polarized light or S-polarized light is actually incident to the first quarter wave plate and by strictly controlling the angle −θ in the relationship with the optimal angle between the slow axes of the quarter wave plates on the basis of the values calculated from the following formulas (1) and (2), the polarization conversion performance exhibited by the quarter wave plate can be utilized to the maximum. As a result, the optical laminate structure according to the present disclosure exhibits high polarization conversion performance and thus, by providing such an optical laminate structure in the HUD, visibility of the display image can be further improved.

$$\tan\theta = \cos\beta \tag{1}$$

$$\beta = \sin^{-1}\left(\sin\alpha \cdot \frac{n_\alpha}{n_\beta}\right) \tag{2}$$

θ: an angle formed by the slow axis of the first quarter wave plate and the polarization axis of S-polarized light or P-polarized light incident to the light control laminate at an arbitrary incident angle α

α: an incident angle of S-polarized light or P-polarized light to the light control laminate $n_\alpha$: refractive index of air $n_\beta$: refractive index of first quarter wave plate The range of the angle θ or −θ satisfying the aforementioned formulas (1) and (2) is preferably controlled to a range of ±3° of the value of the angle θ or −θ and more preferably controlled to a range of ±1° of the value of the angle θ or −θ. If the value of the angle θ or −θ is outside the range of ±3°, when the S-polarized light is incident to the light control laminate, at conversion of the circularly polarized light transmitted through the light reflection layer by the second quarter wave plate to the S-polarized light, a ratio of a P-polarized light component increases, while when the P-polarized light is incident to the light control laminate, at conversion of the circularly polarized light transmitted through the light reflection layer by the second quarter wave plate to the P-polarized light, the ratio of an S-polarized light component increases. Lowering of the polarization conversion performance by the quarter wave plate can be suppressed by controlling the ranges of the angle θ or −θ on the basis of the value calculated from the formulas (1) and (2).

Regarding the refractive index $n_\beta$ of the first quarter wave plate substituted in the formula (2), assuming the refractive index of the first quarter wave plate in a slow axis direction is nx, the refractive index in a direction orthogonal to nx in a plane of the first quarter wave plate is ny, and the refractive index in a thickness direction of the first quarter wave plate is nz, a value obtained by averaging the sum of them is used as an average refractive index. Moreover, when a commercial quarter wave plate is to be used, a value on a catalogue or the like can be also used as the average refractive index. Moreover, if a polymerizable liquid crystal is used as a material of the quarter wave plate, when an ordinary light refractive index no and an extraordinary light reflective index ne inherent in the liquid crystal are used, the average refractive index is expressed as (nx+ny+nz)/3=(no+ne)/2. Showing a specific example of θ calculated from the formulas (1) and (2) and assuming that the refractive index of the air is 1.00, when the two pieces of the quarter wave plates each having the refractive index of 1.55 are used and the incident angle of the S-polarized light or P-polarized light is 50°, the value of θ is 41° on the basis of the formulas (1) and (2) and thus, the range of θ is 38° or more and 44° or less or more preferably 40° or more and 42° or less. Moreover, if the incident angle of the S-polarized light or P-polarized light is 56° or 60°, the value of θ is 40° on the basis of the formulas (1) and (2) and thus, the range of θ is preferably 37° or more and 43° or less or more preferably 39° or more and 41° or less. Furthermore, if the incident angle of the S-polarized light or P-polarized light is 65°, the value of θ is 39° on the basis of the formulas (1) and (2) and thus, the range of θ is preferably 36° or more and 42° or less or more preferably 38° or more and 40° or less. Moreover, when the light control laminate is functional glass sandwiched by two glass plates, and if the P-polarized light is made incident to the glass plate by using the glass plate with the refractive index of 1.48 at the Brewster's angle of approximately 56°, the value of θ is 40° on the basis of the formulas (1) and (2) and thus, the range of θ is preferably 37° or more and 43° or less or more preferably 39° or more and 41° or less.

(Light Reflection Layer)

The light reflection layer used in the present disclosure has a circularly polarized light reflection function for reflecting the circularly polarized light converted by the quarter wave plate which will be described later. The circularly polarized light is roughly divided into two types, and the rightwardly circularly polarized light is called right-handed circularly polarized light, and the leftwardly circularly polarized light is called the left-handed circularly polarized light. The light reflection layer used in the present disclosure includes the right-handed circularly polarized light reflection layer or the left-handed circularly polarized light reflection layer. Such a right-handed circularly polarized light reflection layer or a left-handed circularly polarized light reflection layer is preferably a cholesteric liquid crystal layer having a fixed helical orientation. The cholesteric liquid crystal layer is a polarizer selectively reflecting the circularly polarized light and can be obtained by fixing a cholesteric liquid crystal phase made by forming a helical structure so that either one of the right-handed circularly polarized light or the left-handed circularly polarized light is reflected.

When a cholesteric liquid crystal is used as a material for the right-handed circularly polarized light reflection layer or the left-handed circularly polarized light reflection layer in the light reflection layer, since the cholesteric liquid crystal layer has a phase difference value in the thickness direction, a phase difference occurs due to inclination of the light reflection layer. Thus, an optimal angle of the angle θ formed by the slow axis of each quarter wave plate and the polarization axis of S-polarized light or P-polarized light is varied in accordance with a total thickness of the cholesteric liquid crystal layer. The larger the total thickness of the cholesteric liquid crystal layer used in the light reflection layer is, the more the phase difference in the thickness direction of the cholesteric liquid crystal layer increases. Thus, the optimal angle becomes smaller than the angle θ, and the slow axis of each quarter wave plate gets closer to the polarization axis of S-polarized light or P-polarized light. That is, the optimal angle of the angle θ formed by the slow axis of each quarter wave plate and the polarization axis of S-polarized light or P-polarized light incident to the light control laminate gets closer to 0°. In order to control this optimal angle as much as possible, when the light reflection layer is a cholesteric liquid crystal layer, it is preferable that the angle formed by the slow axis of the first quarter wave plate in the two pieces of the quarter wave plates and the polarization axis of S-polarized light or P-polarized light incident to the light control laminate at an arbitrary incident angle is within a range from 5° to θ, and the angle formed by the slow axis of the second quarter wave plate and the axis of S-polarized light or P-polarized light incident to the light control laminate at an arbitrary incident angle is within a range from −θ to −5°. As described above, by considering an increase in the phase difference by the cholesteric liquid crystal layer, the optimal angle of the angle formed by the slow axis of each quarter wave plate and the axis of S-polarized light or P-polarized light is controlled more strictly, and the polarization conversion performance exhibited by the quarter wave plate can be utilized optimally and to the maximum. As a result, the optical laminate structure according to the present disclosure exhibits higher polarization conversion performance and thus, by providing such an optical laminate structure in the HUD, the visibility of the display image can be further improved.

In the case where the light reflection layer is the cholesteric liquid crystal layer, a specific example of the optimal angle of the angle formed by the slow axis of the first quarter wave plate and the axis of S-polarized light or P-polarized light incident to the light control laminate will be described below. In the specific example described below, the optimal angle of the angle formed by the slow axis of the second quarter wave plate and the axis of S-polarized light or P-polarized light incident to the light control laminate is within the range with "−" (minus) added to the angle formed by the slow axis of the first quarter wave plate and the axis of S-polarized light or P-polarized light incident to the light control laminate. Assuming the refractive index of the air being 1.00, in the case of using a quarter wave plate with a refractive index of 1.55 and the light reflection layer constituted by a cholesteric liquid crystal layer having the phase difference value of 55 nm at 546 nm when being inclined at 50° from the axis perpendicular to the surface, at the incident angle of the S-polarized light or P-polarized light incident to the light control laminate of 45° or 50°, the angle formed by the slow axis of the first quarter wave plate and the polarization axis of S-polarized light or P-polarized light incident to the light control laminate is preferably 25° or more and 45° or less or preferably 35° or more and 40° or less. Moreover, with the incident angle of the S-polarized light or P-polarized light incident to the light control laminate at 56°, the angle formed by the slow axis of the first quarter wave plate and the axis of S-polarized light or P-polarized light incident to the light control laminate is preferably 25° or more and 40° or less or more preferably 35° or more and 40° or less. Moreover, with the incident angle of the S-polarized light or P-polarized light incident to the light control laminate at 65°, the angle formed by the slow axis of the first quarter wave plate and the polarization axis of S-polarized light or P-polarized light incident to the light control laminate is preferably 25° or more and 40° or less or more preferably 30° or more and 35° or less. When the light reflection layer constituted by the cholesteric liquid crystal layer having the phase difference value of 70 nm at 546 nm when being inclined by 50° from the axis perpendicular to the surface is used, with the incident angle of the S-polarized light or P-polarized light incident to the light control laminate at 45° or 50°, the angle formed by the slow axis of the first quarter wave plate and the polarization axis of S-polarized light or P-polarized light incident to the light control laminate is preferably 15° or more and 40° or less or more preferably 25° or more and 40° or less. Moreover, with the incident angle of the S-polarized light or P-polarized light incident to the light control laminate at 56°, the angle formed by the slow axis of the first quarter wave plate and the polarization axis of S-polarized light or P-polarized light incident to the light control laminate is preferably 15° or more and 40° or less or preferably 20° or more and 35° or less. Moreover, with the incident angle of the S-polarized light or P-polarized light incident to the light control laminate at 65°, the angle formed by the slow axis of the first quarter wave plate and the polarization axis of S-polarized light or P-polarized light incident to the light control laminate is preferably 15° or more and 35° or less or preferably 20° or more and 30° or less. When the light reflection layer constituted by the cholesteric liquid crystal layer having the phase difference value of 90 nm at 546 nm when being inclined by 50° from the axis perpendicular to the surface is used, with the incident angle of the S-polarized light or P-polarized light incident to the light control laminate at 45° or 50°, the angle formed by the slow axis of the first quarter wave plate and the polarization axis of S-polarized light or P-polarized light incident to the light control laminate is preferably 10° or more and 35° or less. Moreover, with the incident angle of the S-polarized light or P-polarized light incident to the light control laminate at 56°, the angle formed by the slow axis of the first quarter wave plate and the polarization axis of S-polarized light or P-polarized light incident to the light control laminate is preferably 10° or more and 35° or less, more preferably 10° or more and 30° or less. Moreover, with the incident angle of the S-polarized light or P-polarized light incident to the light control laminate at 65°, the angle formed by the slow axis of the first quarter wave plate and the polarization axis of S-polarized light or P-polarized light incident to the light control laminate is preferably 10° or more and 30° or less or preferably 10° or more and 25° or less.

As described above, as the phase difference in the thickness direction of the cholesteric liquid crystal layer increases, the optimal angle of the angle formed by the slow axis of each quarter wave plate and the axis of S-polarized light or P-polarized light gets closer to 0°. Here, as another specific example, a case where the light control laminate is a functional glass sandwiched by two pieces of glass plates and a P-polarized light is incident to one of glass plates in the vicinity of the Brewster's angle in order to bring the reflectance on a glass plate interface of P-polarized light incident to one of glass plates closer to 0% is explained. When the glass plate with the refractive index of 1.52 is used, the incident angle to the functional glass is preferably 45° to 65° inclusive, more preferably 50° to 60° inclusive. When the P-polarized light is incident to the functional glass within a range from 45° to 65° inclusive, in the case where the light reflection layer constituted by the cholesteric liquid crystal layer having the phase difference value of 55 nm at 546 nm when being inclined by 50° from the axis perpendicular to the surface is used, the angle formed by the slow axis of the first quarter wave plate and the polarization axis of S-polarized light or P-polarized light incident to the functional glass is preferably 25° or more and 40° or less, more preferably 35° or more and 40° or less. Moreover, when the light reflection layer constituted by the cholesteric liquid crystal layer having the phase difference value of 70 nm at 546 nm when being inclined by 50° from the axis perpendicular to the surface is used, the angle formed by the slow axis of the first quarter wave plate and the axis of S-polarized light or P-polarized light incident to the functional glass is preferably 15° or more and 35° or less or more preferably 25° or more and 35° or less. Moreover, when the light reflection layer constituted by the cholesteric liquid crystal layer having the phase difference value of 90 nm at 546 nm when being inclined by 50° is used, the angle formed by the slow axis of the first quarter wave plate and the axis of S-polarized light or P-polarized light incident to the functional glass is preferably 10° or more and 30° or less or more preferably 10° or more and 20° or less.

When the right-handed circularly polarized light reflection layer or the left-handed circularly polarized light reflection layer is the cholesteric liquid crystal layer, the cholesteric liquid crystal constituting such a liquid crystal layer is formed of nematic liquid crystal having chirality, a mixture in which a chiral agent is added to the nematic liquid crystal. Since a direction of the helical and a reflection wavelength can be arbitrarily designed by a type and an amount of the chiral agent, a method of obtaining the cholesteric liquid crystal by adding the chiral agent to the nematic liquid crystal is preferable. Since the nematic liquid crystal is used by fixing the helical orientation state unlike a liquid crystal operated in a so-called electric field, it is preferable that a nematic liquid crystal monomer having a polymerizable group is used.

The nematic liquid crystal monomer containing a polymerizable group is a compound containing the polymerizable group in a molecule and having liquid crystallinity in a temperature range or a concentration range. Examples of the polymerizable group include a (meth)acryloyl group, a vinyl group, a chalconyl group, a cinnamoyl group, and an epoxy group. It is preferable that a mesogenic group is contained in a molecule for a polymerizable liquid crystal to have liquid crystallinity. The mesogenic group is, for example, a rod-shaped or plate-shaped substituent group such as a biphenyl group, a terphenyl group, a (poly)phenyl benzoate group, a (poly)ether group, a benzylideneaniline group, and an acenaphthoquinoxaline group, or a disk-shaped substituent group such as a triphenylene group, a phthalocyanine group, and an azacrown group. Thus, the mesogenic group is a group capable of inducing liquid crystal phase behavior. A liquid crystal compound containing a rod-shaped or plate-shaped group is known as a calamitic liquid crystal in the present technical field. Examples of nematic liquid crystal monomers containing such a polymerizable group include polymerizable liquid crystals disclosed in Japanese Patent Application Laid-Open No. 2003-315556 and Japanese Patent Application Laid-Open No. 2004-29824, Paliocolor series (manufactured by BASF Ltd.), and RMM series (manufactured by Merck KGaA). These nematic liquid crystal monomers containing a polymerizable group may be used alone or may be used in combinations of two or more.

The chiral agent is preferably a compound that is capable of causing right-handed or left-handed helical orientation of the above-described nematic liquid crystal monomer containing a polymerizable group and contains a polymerizable group like the nematic liquid crystal monomer containing a polymerizable group. Such a chiral agent is, for example, Paliocolor LC756 (manufactured by BASF Ltd.), and a compound disclosed in Japanese Patent Application Laid-Open No. 2002-179668. The direction of circularly polarized light to be reflected is determined by the kind of the chiral agent, and the reflected wavelength of a light reflection layer can be changed in accordance with the amount of the chiral agent added to nematic liquid crystal. For example, a light reflection layer that reflects light having a wavelength on a shorter wavelength side can be obtained by increasing the amount of the added chiral agent. An added amount of the chiral agent is different depending on the type of the chiral agent and the wavelength to be reflected, but in order to adjust the center reflection wavelength of the light reflection layer to the ordinary light to a desired wavelength area, it is preferably 0.5 to 30 parts by weight to 100 parts by weight of the nematic liquid crystal monomer having a polymerizable group, more preferably 1 to 20 parts by weight or further preferably 3 to 10 parts by weight.

In addition, a polymerizable compound that can react with the nematic liquid crystal monomer containing a polymerizable group and has no liquid crystallinity may be added. Such a compound is, for example, ultraviolet curable resin. Examples of the ultraviolet curable resin include dipentaerythritol hexa(meth)acrylate, a reaction product of dipentaerythritol penta(meth)acrylate and 1,6-hexamethylene-diisocyanate, a reaction product of isocyanuric-ring-containing tri-isocyanate and pentaerythritol tri(meth)acrylate, a reaction product of pentaerythritol tri(meth)acrylate and isophorone-di-isocyanate, dipentaerythritol penta(meth)acrylate, dipentaerythritol tetra(meth)acrylate, pentaerythritol tetra(meth)acrylate, pentaerythritol tri(meth)acrylate, trimethylolpropane tri(meth)acrylate, ditrimethylolpropane tetra(meth)acrylate, tris (acryloxyethyl)isocyanurate, tris (methacryloxyethyl)isocyanurate, a reaction product of glycerol triglycidyl ether and (meth)acrylic acid, caprolactone denaturation tris (acryloxyethyl)isocyanurate, a reaction product of trimethylolpropane triglycidyl ether and (meth)acrylic acid, triglycerol-di-(meth)acrylate, a reaction product of propylene glycol-di-glycidyl ether and (meth)acrylic acid, polypropylene glycol-di-(meth)acrylate, tripropylene glycol-di-(meth)acrylate, polyethylene glycol-di-(meth)acrylate, tetraethylene glycol-di-(meth)acrylate, triethylene glycol-di-(meth)acrylate, pentaerythritol-di-(meth)acrylate, a reaction product of 1,6-hexanediol-di-glycidyl ether and (meth)acrylic acid, 1,6-hexanediol-di-(meth)acrylate, glycerol-di-(meth)acrylate, a reaction product of ethylene glycol-di-glycidyl ether and (meth)acrylic acid, a reaction product of diethylene glycol-di-glycidyl ether and (meth)acrylic acid, bis (acryloxyethyl) hydroxyethyl isocyanurate, bis (methacryloxyethyl) hydroxyethyl isocyanurate, a reaction product of b isphenol A-di-glycidyl ether and (meth)acrylic acid, tetrahydrofurfuryl (meth)acrylate, caprolactone denaturation tetrahydrofurfuryl (meth)acrylate, 2-hydroxyethyl (meth)acrylate, 2-hydroxypropyl (meth)acrylate, polypropylene glycol (meth)acrylate, polyethylene glycol (meth)acrylate, phenoxy hydroxypropyl (meth)acrylate, acryloyl morpholine, methoxy polyethylene glycol (meth)acrylate, methoxy tetraethylene glycol (meth)acrylate, methoxy triethylene glycol (meth)acrylate, methoxy ethylene glycol (meth)acrylate, methoxy ethyl (meth)acrylate, glycidyl (meth)acrylate, glycerol (meth)acrylate, ethyl carbitol (meth)acrylate, 2-ethoxyethyl (meth)acrylate, N,N-dimethylaminoethyl (meth)acrylate, 2-cyanoethyl (meth)acrylate, a reaction product of butyl glycidyl ether and (meth)acrylic acid, butoxy triethylene glycol (meth)acrylate, and butanediol mono(meth)acrylate. These resins may be used alone or may be used as a mixture of some of the resins. These ultraviolet curable resins having no liquid crystallinity need to be added in such an amount that a composition containing the nematic liquid crystal monomer does not lose liquid crystallinity, and the amount added is preferably 0.1 to 20 parts by weight, more preferably 1.0 to 10 parts by weight based on 100 parts by weight of the nematic liquid crystal monomer containing a polymerizable group.

If the aforementioned nematic liquid crystal monomer having a polymerizable group and the polymerizable compound are ultraviolet curable, the composition containing them is curable by ultraviolet rays and thus, a photopolymerization initiator is added in order to cure the composition containing them by ultraviolet rays. Examples of the photopolymerization initiator include: 2-methyl-1-[4-(methylthio)phenyl]-2-morpholinopropane-1 (Irgacure 907 manufactured by BASF Ltd.), 1-hydroxy cyclohexyl phenyl ketone (Irgacure 184 manufactured by BASF Ltd.), 4-(2-hydroxyethoxy)-phenyl(2-hydroxy-2-propyl) ketone (Irgacure 2959 manufactured by BASF Ltd.), 1-(4-dodecylphenyl)-2-hydroxy-2-methylpropan-1-one (Darocure 953 manufactured by Merck KGaA), 1-(4-isopropylphenyl)-2-hydroxy-2-methylpropan-1-one (Darocure 1116 manufactured by Merck KGaA), 2-hydroxy-2-methyl-1-phenylpropan-1-one (Irgacure 1173 manufactured by BASF Ltd.), an acetophenone compound such as diethoxyacetophenone, benzoin, benzoin compounds such as benzoin methyl ether, benzoin ethyl ether, benzoin isopropyl ether, benzoin isobutyl ether, and 2,2-dimethoxy-2-phenylacetophenone (Irgacure 651 manufactured by BASF Ltd.), benzophenone compounds such as benzoylbenzoic acid, methyl benzoylbenzoate, 4-phenylbenzophenone, hydroxybenzophenone, 4-benzoyl-4'-methyldiphenyl sulfide, and 3,3'-dimethyl-4-methoxybenzophenone (Kayacure MBP manufactured by Nippon Kayaku Co., Ltd.), and thioxanthone compounds such as thioxanthone, 2-chlorothioxanthone (Kayacure CTX manufactured by Nippon Kayaku Co., Ltd.), 2-methylthioxanthone, 2,4-dimethylthioxanthone (Kayacure RTX manufactured by Nippon Kayaku Co., Ltd.), isopropyl thioxanthone, 2,4-dichlorothioxanthone (Kayacure CTX manufactured by Nippon Kayaku Co., Ltd.), 2,4-diethylthioxanthone (Kayacure DETX manufactured by Nippon Kayaku Co., Ltd.), or 2,4-diisopropylthioxanthone (Kayacure DITX manufactured by Nippon Kayaku Co., Ltd.). The photopolymerization initiator is preferably, for example, Irgacure TPO, Irgacure TPO-L, Irgacure OXE01, Irgacure OXE02, Irgacure 1300, Irgacure 184, Irgacure 369, Irgacure 379, Irgacure 819, Irgacure 127, Irgacure 907, or Irgacure 1173 (all manufactured by BASF Ltd.), more preferably, Irgacure TPO, Irgacure TPO-L, Irgacure OXE01, Irgacure OXE02, Irgacure 1300, Irgacure 369, or Irgacure 907. These photopolymerization initiators may be used alone or may be used as a mixture of some of the initiators at an optional ratio.

When a benzophenone compound or a thioxanthone compound is used as the photopolymerization initiator, an auxiliary agent may be additionally used to promote optical polymerization reaction. Examples of such an auxiliary agent include amine compounds such as triethanolamine, methyldiethanolamine, triisopropanolamine, n-butylamine, N-methyldiethanolamine, diethylaminoethyl methacrylate, Michler's ketone, 4,4'-diethylamin phenone, ethyl 4-dimethylaminobenzoate, (n-butoxy)ethyl 4-dimethylaminobenzoate, and isoamyl 4-dimethylaminobenzoate.

The amounts of the photopolymerization initiator and the auxiliary agent added can be in such a range that the liquid crystallinity of the composition containing the nematic liquid crystal monomer is not affected, and is preferably 0.5 to 10 parts by weight, more preferably 2 to 8 parts by weight approximately, based on 100 parts by weight of ultraviolet-curable compound in the composition. The amount of the auxiliary agent added to the composition is preferably 0.5 to 2 times larger than the mass of the photopolymerization initiator.

Moreover, the compositions containing the aforementioned cholesteric liquid crystal may contain one or more additives such as a leveling agent, a defoaming agent, an ultraviolet absorbing agent, a photostabilizing agent, an oxidation inhibitor, a polymerization inhibitor, a crosslinking agent and the like so as to give the intended functions, respectively, as necessary. The leveling agents include fluorine compounds, silicone compounds, and acrylic compounds, for example. The ultraviolet absorbing agents include benzotriazole compounds, benzophenone compounds, and triazine compounds, for example. The photostabilizing agents include hindered amine compounds, and benzoate compounds, for example. The oxidation inhibitors include phenol compounds, for example. The polymerization inhibitors include methoquinone, methyl hydroquinone, and hydroquinone, for example. The crosslinking agents include polyisocyanates such as alicyclic polyisocyanate, tolylene diisocyanate, xylylene diisocyanate, 4,4'-diphenylmethane diisocyanate and the like and melamine compounds, for example. The added amounts of each of these additives are designed as appropriate in accordance with the function to be given.

The following describes a method of producing the light reflection layer used in the present disclosure by using the above-described cholesteric liquid crystal. In such a method, for example, a necessary amount of a chiral agent causing right-handed or left-handed helical orientation is added to a nematic liquid crystal monomer containing a polymerizable group to reflect light having a desired wavelength. Subsequently, this mixture is dissolved into a solvent, and then a photopolymerization initiator is added. Such a solvent is not particularly limited as long as the solvent dissolves the liquid crystal monomer and the chiral agent in use and the like. The solvent is, for example, cyclopentanone, toluene, methyl ethyl ketone, or methyl isobutyl ketone, and is preferably, for example, cyclopentanone or toluene. Thereafter, this solution is coated on a plastic substrate such as a triacetylcellulose (TAC) film, an acrylic film, a polycarbonate film, a polyvinyl chloride film, a polyolefin film, or a polyethylene terephthalate (PET) film so that the thickness thereof is uniform as possible, and then is left to stand for a constant time under such a temperature condition that cholesteric liquid crystal is obtained on the plastic substrate and oriented at a desired helical pitch while the solvent is removed by heating. In this case, when orientation processing such as rubbing or stretching is performed on the surface of the plastic film before the coating, the cholesteric liquid crystal can be more uniformly oriented, and the haze value as the light reflection layer can be reduced. Subsequently, while this orientation state is held, the film is irradiated with ultraviolet from, for example, a high-pressure mercury lamp to fix the orientation of the cholesteric liquid crystal, thereby obtaining the cholesteric liquid crystal layer used for forming the light reflection layer on the plastic substrate. Here, when the chiral agent having the right-handed helical orientation is selected, the obtained light reflection layer selectively reflects the rightwardly circularly polarized light, while if the chiral agent having the left-handed helical orientation is selected, the obtained light reflection layer selectively reflects the leftwardly circularly polarized light. This phenomenon that particular circularly polarized light is selectively reflected is referred to as selective reflection, and a selectively reflected wavelength band is referred to as a selective reflection region.

As another method for adjusting the reflectance to the ordinary light of the light reflection layer, a change of a thickness of the light reflection layer in production of the light reflection layer can be cited. Usually, the thicker the light reflection layer becomes, the more the reflectance is improved, but since the light reflection layer used in the present disclosure has the function of reflecting the circularly polarized light of either one of the left-handed circularly polarized light or the right-handed circularly polarized light, the reflectance does not become larger than 50% which is the theoretically maximum reflectance. Thus, in order to set the reflectance to the ordinary light in the present disclosure to 5% or more and 25% or less, approximately half or less of the thickness at the theoretically maximum reflectance is preferable, and in accordance with the types of the cholesteric liquid crystal and the chiral agent in use, the thickness of a single layer of the light reflection layer is preferably 0.1 to 3 µm or more preferably 0.3 to 2.5 µm or less, for example. On the other hand, if the light reflection layer is the cholesteric liquid crystal layer, since the cholesteric liquid crystal layer has a phase difference value in the thickness direction, the polarization conversion performance of the light control laminate can be controlled more strictly by appropriately controlling the total thickness of the light reflection layer. Thus, the total thickness of the light reflection layer is preferably 0.1 µm or more and 7 µm or less, more preferably 0.3 µm or more and 5 µm or less or further preferably 0.5 µm or more and 3 µm or less. If the total thickness of the light reflection layer is smaller than 0.1 µm, the circularly polarized light conversion function of the light reflection layer does not act effectively, while if the thickness of each light reflection layer is larger than 7 µm, orientation of the light reflection layer is disturbed, and transparency is lowered. Moreover, if the reflectance of each light reflection layer to the ordinary light can be adjusted within the desired range, the thickness of each light reflection layer may be the same or may be different.

Since the light reflection layer needs to reflect to the wavelength of the incident light, it is preferable that reflection is made to polarized light in blue, green, and red in a visible light area. On the other hand, when such a light reflection layer is provided on glass for which visible light transmittance is legally restricted such as a windshield of an automobile, if the reflectance of the light reflection layer to light not subjected to processing of taking out only a specific polarization component by a polarization filter or the like, that is, so-called ordinary light is too high, transmittance is lowered and as a result, it cannot be used for the glass requiring high visible light transmittance. Thus, it is preferable that the reflectance of the light reflection layer to the ordinary light is controlled appropriately.

From the aforementioned point of view, it is preferable that the light reflection layer has the cholesteric liquid crystal layer and at least two or more light reflection layers having center reflection wavelengths different from each other are laminated, and the laminated at least two or more light reflection layers include at least one light reflection layer among the light reflection layer PRL-1 having the center reflection wavelength of 400 nm or more and less than 500 nm and reflectance to ordinary light at the center reflection wavelength of 5% or more and 25% or less, the light reflection layer PRL-2 having a center reflection wavelength of 500 nm or more and less than 600 nm and reflectance to ordinary light at the center reflection wavelength of 5% or more and 25% or less, and the light reflection layer PRL-3 having a center reflection wavelength of 600 nm or more and less than 700 nm and reflectance to ordinary light at the center reflection wavelength of 5% or more and 25% or less, and they all have the characteristic of reflecting the polarized light with the same direction. It means that if such a light reflection layer includes only any one of the light reflection layers among the light reflection layer PRL-1, the light reflection layer PRL-2, and the light reflection layer PRL-3, for example, the light reflection layer is constituted by a lamination structure of the only one light reflection layer of the light reflection layers PRL-1, PRL-2, and PRL-3 and at least one or more light reflection layers selected from a group consisting of another light reflection layer having the center reflection wavelength different from these light reflection layers, and each light reflection layer has the characteristic of reflecting the polarized light with the same direction. That is, it is intended that the number of layers of the light reflection layers constituting the light reflection layer is at least two or more and that the layers include at least one or more light reflection layers among the light reflection layers PRL-1, PRL-2, and PRL-3, each light reflection layer has the center reflection wavelength different from each other and each of them has the characteristic of reflecting the polarized light with the same direction.

The reflectance to the ordinary light at the center reflection wavelength of each of the light reflection layers PRL-1, PRL-2, and PRL-3 is preferably 5% or more and 25% or less, more preferably 10% or more and 25% or less or further preferably 15% or more and 20% or less. If the upper limit value of the reflectance is less than 5%, the reflectance is too low, and if such a light reflection layer is installed on the windshield of the HUD, for example, a desired display image cannot be projected to the windshield, while if the upper limit value of the reflectance is larger than 25%, transmittance is too high and cannot cope with the legal limit requiring high visible light transmittance for the windshield. Moreover, the reflectance to the ordinary light at the center reflection wavelength shown by each light reflection layer may be the same for all or may be different as long as it can be adjusted within the aforementioned range.

The center reflection wavelength means a wavelength which is an average of a wavelength on a short wavelength side corresponding to 80% of the maximum reflectance of each light reflection layer and a wavelength on a long wavelength side. If the maximum reflectance of PRL-1 is 20%, for example, assuming the wavelength on the short wavelength side indicating the reflectance of 16% corresponding to 80% of that is $\lambda 1$ and the wavelength on the long wavelength side is $\lambda 3$, $\lambda 2$ shown in the following formula (3) is the center reflection wavelength:

$$(\lambda 1+\lambda 3)/2=\lambda 2 \qquad (3)$$

If one or more of the light reflection layers PRL-1, PRL-2, and PRL-3 is used as the light reflection layer, the number of layers can be adjusted in accordance with a width of a reflection band of each light reflection layer for these light reflection layers. If the light can be reflected in the desired wavelength area, it may be any one layer in the PRL-1, PRL-2, and PRL-3 or two layers may be laminated or three layers may be laminated together. Moreover, if the reflection band is to be adjusted to a wider area, the further light reflection layer having the center reflection wavelength different from those of the light reflection layers PRL-1, PRL-2, and PRL-3 can be used for the light reflection layer to be laminated, but at conversion from the circularly polarized light to linearly polarized light by the quarter wave plate which will be described later, there is necessity to covert to the linearly polarized light with the same direction. Thus, each of the laminated light reflection layers needs to have the characteristic of reflecting the polarized light with the same direction.

At least two or more light reflection layers to be laminated preferably include two or three light reflection layers in the light reflection layer PRL-1, the light reflection layer PRL-2, and the light reflection layer PRL-3. The light reflection layer having such a constitution has the center reflection wavelength in any two or three areas in each of reflection areas showing reflection of blue-colored light, green-colored light or red-colored light and thus, the reflection characteristic in the visible light area can be further improved.

If a full width at half maximum of each light reflection layer of the light reflection layers PRL-1, PRL-2, and PRL-3 is large, reflection in a most part of the visible light area can be covered by inclusion of one layer or two layers in any of the light reflection layers PRL-1, PRL-2, and PRL-3, but if the full width at half maximum of each light reflection layer is small, it is more preferable that all the three light reflection layers PRL-1, PRL-2, and PRL-3 are laminated in order to realize multi-color polarized light to be reflected. The number of laminated layers of the light reflection layers PRL-1, PRL-2, and PRL-3 can be adjusted as appropriate in accordance with the full width at half maximum such that if the full width at half maximum is within a small range from 100 nm or more to less than 200 nm, all the three layers of the light reflection layers PRL-1, PRL-2, and PRL-3 are included, while if the full width at half maximum is from 200 nm or more to less than 500 nm, any one layer or two layers in the light reflection layers PRL-1, PRL-2, and PRL-3 are included, for example, as the light reflection layer. Moreover, if each of the center reflection wavelengths of at least two or more light reflection layers to be laminated is separated by 100 to 300 nm, for example, it is preferable that a reflection spectrum of each light reflection layer is designed so as to overlap as appropriate by 5% or more or preferably 10% or more, for example, over the entire visible light area or preferably over the entire wavelength area from 400 to 700 nm. Methods for laminating each of the light reflection layers is not particularly limited, and a method of laminating another light reflection layer directly on the light reflection layer, a method of indirectly laminating through an adhesive layer made of an adhesive agent, a bonding agent and the like can be cited, for example.

Figure 4:
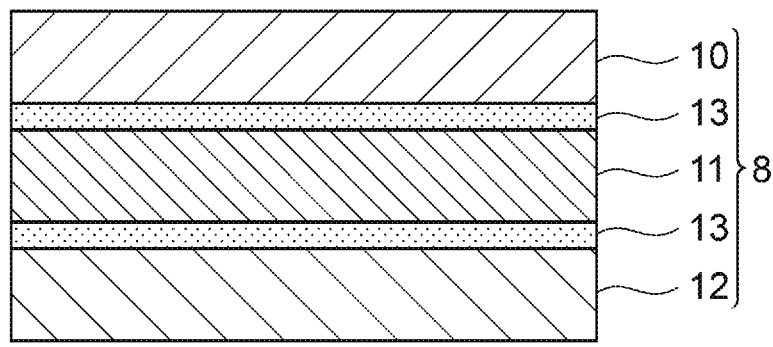
FIG. 4 A side sectional view illustrating a first embodiment of a light reflection layer used in the present disclosure.

FIG. 4 illustrates an example of a constitution of the light reflection layer used in the present disclosure. In a light reflection layer 8 illustrated in FIG. 4, light reflection layers 10, 11, 12 corresponding to each of the light reflection layers PRL-1, PRL-2, and PRL-3 are laminated through an adhesive layer 13 made of a bonding agent or an adhesive agent. An order of laminating the light reflection layers PRL-1, PRL-2, and PRL-3 is not particularly limited, and they can be arranged at arbitrary positions in the thickness direction of the light reflection layer 8. As an adhesive agent used for the adhesive layer 13, an acrylic or rubber-based adhesive agent can be cited, but an acrylic adhesive agent whose adhesiveness, holding forces and the like can be easily adjusted is preferable. Moreover, as a bonding agent used in the adhesive layer 13, an ultraviolet curable resin composition, a thermally curable resin composition and a mixture of them can be cited. In the case of the ultraviolet curable resin, a composition in which a plurality of monomers having an acryloyl group or an epoxy group is mixed is cured by being irradiated with ultraviolet rays in presence of a photopolymerization initiator so as to bond each light reflection layer. In the case of the thermally curable resin composition, a composition in which a plurality of monomers having an epoxy group is mixed is heated in presence of an acid catalyst and cured so as to bond each light reflection layer. Alternatively, a composition made of a plurality of monomers or polymers having an amino group, a carboxyl group or a hydrocarbon group is heated in presence of a compound having an isocyanate group or melamine and cured so as to bond each light reflection layer.

Regarding the light reflection layer, the reflection wavelength is changed by an angle of the incident light in some cases. In the case of the light reflection layer made of a cholesteric liquid crystal layer, for example, the center reflection wavelength $\lambda 2$ is shifted to the short wavelength side as the light reflection layer is tilted from a front surface direction of the light reflection layer. At this time, even if the center reflection wavelengths $\lambda 2$ of the light reflection layers PRL-1, PRL-2, and PRL-3 are shifted to the short wavelength side, reflection by another light reflection layer having the center reflection wavelength $\lambda 2$ closer to the long wavelength side than them of the light in a reflection band of the light reflection layer shifted to the short wavelength side instead can suppress a color change of the display image. However, if the light reflection layer is largely tilted, the light of the PRL-3 in the reflection band cannot be reflected anymore, and a phenomenon that colors in the display image or particularly display in red color on the long wavelength side becomes unclear, and the display image in correct colors cannot be projected occurs in some cases. This phenomenon can occur on the image displayed on a passenger seat side which is the farthest away from the driver and on an upper side of the windshield if the HUD is carried out on the whole surface of the windshield for automobile. In such a case, improvement can be made by further laminating, on the light reflection layer, a light reflection layer PRL-4 having a center reflection wavelength of 700 nm or more and 950 nm or less, preferably 720 nm or more and 900 nm or less, more preferably 730 nm or more and 900 nm or less or further preferably 730 nm or more and 850 or less and the reflectance to the ordinary light at the center reflection wavelength of 5% or more and 25% or less, preferably 10% or more and 20% or less or more preferably 15% or more and 20% or less and having a characteristic of reflecting polarized light with the same direction as those of PRL-1, PRL-2, and PRL-3.

The light reflection layer PRL-4 is the same as the other light reflection layers PRL-1, PRL-2, and PRL-3 except that the center reflection wavelength is in a near infrared area. The light reflection layer PRL-4 is transparent since it does not have a reflection area in a visible light area in the front surface direction, but by tilting the light reflection layer PRL-4 from the front surface direction, the reflection band is shifted to the short wavelength side, and the light in the visible light area begins to be reflected. At that time, by setting the center reflection wavelength of the light reflection layer PRL-4 so that the center reflection wavelength $\lambda 2$ is shifted to the reflection band of the light reflection layer PRL-3, even when the windshield of the HUD on which the light reflection layer of such a constitution is provided is seen diagonally, the display image in the same color as that in the front surface direction can be visually recognized.

Figure 5:
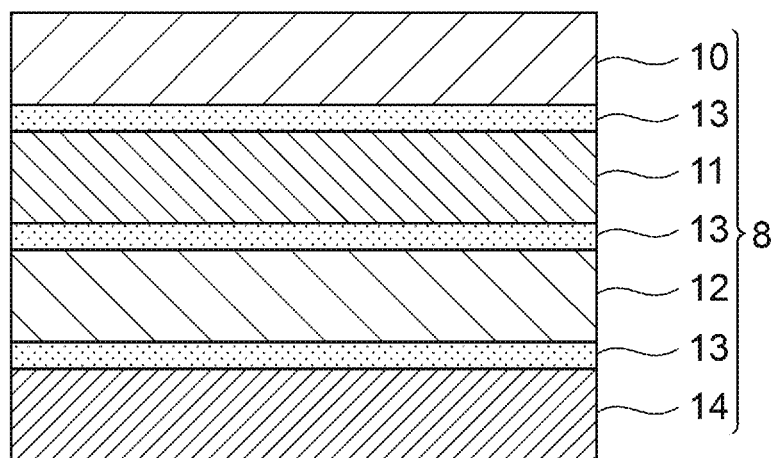
FIG. 5 A side sectional view illustrating a second embodiment of a light reflection layer used in the present disclosure.

FIG. 5 illustrates an example of a constitution of the light reflection layer including the light reflection layer PRL-4. In the light reflection layer 8 illustrated in FIG. 5, the light reflection layers 10, 11, 12, and 14 corresponding to each of the light reflection layers PRL-1, PRL-2, and PRL-3, and the light reflection layer PRL-4, respectively, are laminated through the adhesive layer 13 made of a bonding agent or an adhesive agent. The order of laminating the light reflection layer PRL-4 is not particularly limited and can be arranged at an arbitrary position in the thickness direction of the light reflection layer 8. The reflectance to the ordinary light at the center reflection wavelength of the light reflection layer PRL-4 is preferably the same as the other light reflection layers or particularly as that of the PRL-3. Moreover, the direction of the polarized light is adjusted to the same directions of the other light reflection layers PRL-1, PRL-2, and PRL-3 laminated with the light reflection layer PRL-4.

The light reflection layer PRL-4 also has a heat shielding effect to the solar light since it has a reflection band in the near infrared area. Thus, by using the light reflection layer including one or more of the light reflection layers PRL-1, PRL-2, and PRL-3 and the light reflection layer PRL-4 for the windshield of an automobile, not only that visibility of the display image in the HUD can be improved while a high visible light transmittance is held but also angle dependence of the display image in the HUD is also improved and moreover, contribution can be made to suppression on a rise of a temperature in the vehicle by the heat shielding effect. Particularly when only one layer in the light reflection layers PRL-1, PRL-2, and PRL-3 is used, it is preferable that PRL-4 is further laminated. By the lamination of two layers, that is, any one layer of the light reflection layers PRL-1, PRL-2, and PRL-3 and the light reflection layer PRL-4, multi-color display and a correction effect of the visible light reflection by the shift from the near infrared area can be both realized with the smaller number of laminated layers.

The reflection band of each of the laminated light reflection layers is preferably wider in order to allow light with a plurality of wavelengths from a light source to be reflected efficiently with a smaller number of laminated layers and to suppress a change in the reflection band by the short wavelength shift with tilting, and the full width at half maximum of the reflection spectrum of each light reflection layer is preferably 100 nm or more and 500 nm or less, more preferably 150 nm or more and 400 nm or less or further preferably 150 nm or more and 350 nm or less, for example. If the full width at half maximum is less than 100 nm, the reflection wavelength of each light reflection layer is largely shifted by the short wavelength shift with the tilting, not only that an effect of improving brightness is lowered but also there is a tendency that the correction effect of the visible light reflection by the shift from the near infrared area as in the light reflection layer PRL-4 is limited. Moreover, to lower the reflectance while the full width at half maximum is maintained at less than 100 nm or particularly 50 nm or less is difficult in many cases. On the other hand, if the full width at half maximum exceeds 500 nm, the reflectance is largely lowered and thus, to obtain the reflectance of 5% or more becomes difficult, which is not desirable. Moreover, if the same material of a cholesteric liquid crystal is used in each light reflection layer, for example, when the full width at half maximum of each light reflection layer is wide, the reflectance becomes lower, while when the full width at half maximum is small, the reflectance tends to become higher. Thus, by appropriately adjusting the full width at half maximum of each light reflection layer, the reflectance of the specific polarized light can be improved more effectively. The full width at half maximum, here, means the width of the wavelength divided by the wavelength on the long wavelength side and the wavelength on the short wavelength side, corresponding to 50% of the maximum reflectance of the light reflection layer. If the wavelength on the short wavelength side corresponding to 50% of the maximum reflectance is 450 nm and the wavelength on the long wavelength side is 550 nm, for example, the full width at half maximum is 100 nm. The wavelength corresponding to 50% of the maximum reflectance can be acquired on the basis of the reflectance derived from selective reflection by subtracting an average value (an average value in 350 nm to 950 nm, for example) of the reflectance other than the selective reflection area from the maximum reflectance in the selective reflection area. If the value of the maximum reflectance of the selective reflection area is 30% and the average value of the reflectance other than the selective reflectance (baseline of the reflectance) is 6%, for example, the wavelength corresponding to 50% of the maximum reflectance means a wavelength indicating the reflectance of 18% obtained by subtracting (30−6)/2 from 30%.

(Quarter Wave Plate)

The quarter wave plate used in the present disclosure is a phase difference element having a function of converting the circularly polarized light to the linear circularly polarized light and can be obtained by uniaxial drawing of a film made of polycarbonate or cycloolefin polymer so that the phase difference becomes ¼ of the wavelength or by orienting the polymerizable liquid crystal which is horizontally oriented with such a thickness that the phase difference becomes ¼ of the wavelength, for example. This quarter wave plate may be used alone or if a shift in the phase difference by wavelength dispersion is large, a phase difference element called a wide band quarter wave plate may be used. The wide band quarter wave plate is a phase difference element whose wavelength dependence of the phase difference is reduced, and a phase difference element in which a half wave plate and a quarter wave plate having the same wavelength dispersion are laminated so that an angle formed by the respective slow axes is 60°, a polycarbonate-based phase difference element (by Teijin Limited; Pure-Ace WR-S) whose wavelength dependence of the phase difference is reduced can be cited, for example. Moreover, in the case of incidence diagonally as in the HUD so that the incident angle to the quarter wave plate, the phase difference is changed by the incident angle of the light depending on the phase difference element in some cases. In such a case, as a method of matching the phase difference more strictly, the change in the phase difference with the incident angle can be suppressed by using the phase difference element with the refractive index of the phase difference element adjusted, for example. As such an example, assuming that the refractive index in the slow axis direction in the plane of the phase difference element is nx, the refractive index in the direction orthogonal to nx in the plane of the phase differ-ence element is ny, and the refractive index in the thickness direction of the phase difference element is nz, control is executed so that a coefficient Nz expressed in the following formula (4) becomes preferably 0.3 to 1.0 or more preferably 0.5 to 0.8.

$$Nz=(nx-nz)/(nx-ny) \quad (4)$$

If the slow axis or a fast axis of the quarter wave plate to be used is 45 degrees to a lengthy direction of the rolled quarter wave plate, by laminating the rolled quarter wave plate and the similarly rolled light reflection layer in a roll-to-roll manner, a light control laminate of the present disclosure in which the slow axis or the fast axis is 45 degrees to the lengthy direction of the roll can be obtained. Moreover, in a state where the slow axis or the fast axis of the first quarter wave plate and the slow axis or the fast axis of the second quarter wave plate are orthogonal to each other, for example, the light reflection layer can be sandwiched. If the incident light from image display units of the HUD is P-polarized light, in order to use the optical laminate structure according to the present disclosure for the windshield of a vehicle, it is preferable that the slow axis or the fast axis of the first quarter wave plate is less than 45° to the polarization axis of the P-polarized light. If the lamination is carried out so that the slow axis or the fast axis of the quarter wave plate to the rolled light reflection layer is 0° or 90°, when the rolled quarter wave plate is to be cut out to a desired size, the quarter wave plate should be positioned so as to be 45° to the lengthy direction of the roll and thus, a large number of portions that cannot be used are generated, which lower a yield. On the other hand, as described above, by using the laminating method such that the slow axis or the fast axis of the quarter wave plate is 45° to the lengthy direction of the roll, the quarter wave plate can be cut out with a desired size in a parallel direction or an orthogonal direction to the lengthy direction of the rolled light reflection layer and thus, the yield can be drastically improved.

Moreover, other than lamination of the rolled quarter wave plate and the rolled light reflection layer in the roll-to-roll manner, the light reflection layer may be directly laminated on the quarter wave plate. Since the light reflection layer is directly laminated on the quarter wave plate, a light reflection layer with a low haze value can be obtained without executing orientation processing such as rubbing. Moreover, it is preferable that at least either one of the first quarter wave plate and second quarter wave plate includes a polymerizable liquid crystal layer. In such a case, adhesion between the quarter wave plate and the light reflection layer made of the cholesteric liquid crystal layer is improved, and the reflectance to the polarized light can be also improved.

As described above, in the present disclosure, by controlling the angle θ formed by the polarization axis of P-polarized light or S-polarized light incident to the optical laminate structure and the slow axis of the quarter wave plate, the polarization conversion performance exhibited by the quarter wave plate can be further improved. In such a case, from viewpoints of controllability and production costs of the slow axis of the quarter wave plate, it is particularly preferable that the quarter wave plate including a polymerizable liquid crystal layer as a layer having an action for converting the polarized light is used.

The polymerizable liquid crystal is a nematic liquid crystal monomer having a polymerizable group in a molecule and showing liquid crystallinity in a certain temperature range or concentration range. As the polymerizable group, a (meth)acryloyl group, a vinyl group, a chalconyl group, a cinnamoyl group, and an epoxy group can be cited, for example. In order for the polymerizable liquid crystal to show the liquid crystallinity, it is preferable that a mesogenic group is contained in a molecule, and the mesogenic group means a group capable of inducing liquid crystal phase behavior, that is, for example, a rod-shaped or plate-shaped substituent group such as a biphenyl group, a terphenyl group, a (poly)phenyl benzoate group, a (poly)ether group, a benzylideneaniline group or an acenaphthoquinoxaline group, or a disk-shaped substituent group such as a triphenylene group, a phthalocyanine group or an azacrown group. A liquid crystal compound containing a rod-shaped or plate-shaped substituent group is known as a calamitic liquid crystal in the present technical field. Examples of nematic liquid crystal monomers containing such a polymerizable group include polymerizable liquid crystals described in Japanese Patent Application Laid-Open No. 2003-315556 and Japanese Patent Application Laid-Open No. 2004-29824, Paliocolor series (manufactured by BASF Ltd.), and RMM series (manufactured by Merck KGaA). These nematic liquid crystal monomers containing a polymerizable group may be used alone or may be used in combinations of two or more.

In addition, a polymerizable compound that can react with the nematic liquid crystal monomer containing a polymerizable group and has no liquid crystallinity may be added. Such compounds include, for example, ultraviolet curable resin. Examples of the ultraviolet curable resin include dipentaerythritol hexa(meth)acrylate, a reaction product of dipentaerythritol penta(meth)acrylate and 1,6-hexamethylene-di-isocyanate, a reaction product of isocyanuric-ring-containing tri-isocyanate and pentaerythritol tri(meth)acrylate, a reaction product of pentaerythritol tri(meth)acrylate and isophorone-di-isocyanate, dipentaerythritol penta(meth)acrylate, dipentaerythritol tetra(meth)acrylate, pentaerythritol tetra(meth)acrylate, pentaerythritol tri(meth)acrylate, trimethylolpropane tri(meth)acrylate, ditrimethylolpropane tetra(meth)acrylate, tris (acryloxyethyl)isocyanurate, tris (methacryloxyethyl)isocyanurate, a reaction product of glycerol triglycidyl ether and (meth)acrylic acid, caprolactone denaturation tris (acryloxyethyl)isocyanurate, a reaction product of trimethylolpropane triglycidyl ether and (meth)acrylic acid, triglycerol-di-(meth)acrylate, a reaction product of propylene glycol-di-glycidyl ether and (meth)acrylic acid, polypropylene glycol-di-(meth)acrylate, tripropylene glycol-di-(meth)acrylate, polyethylene glycol-di-(meth)acrylate, tetraethylene glycol-di-(meth)acrylate, triethylene glycol-di-(meth)acrylate, pentaerythritol-di-(meth)acrylate, a reaction product of 1,6-hexanediol-di-glycidyl ether and (meth)acrylic acid, 1,6-hexanediol-di-(meth)acrylate, glycerol-di-(meth)acrylate, a reaction product of ethylene glycol-di-glycidyl ether and (meth)acrylic acid, a reaction product of diethylene glycol-di-glycidyl ether and (meth)acrylic acid, bis (acryloxyethyl) hydroxyethyl isocyanurate, bis (methacryloxyethyl) hydroxyethyl isocyanurate, a reaction product of bisphenol A-di-glycidyl ether and (meth)acrylic acid, tetrahydrofurfuryl (meth)acrylate, caprolactone denaturation tetrahydrofurfuryl (meth)acrylate, 2-hydroxyethyl (meth)acrylate, 2-hydroxypropyl (meth)acrylate, polypropylene glycol (meth) acrylate, polyethylene glycol (meth)acrylate, phenoxy hydroxypropyl (meth)acrylate, acryloyl morpholine, methoxy polyethylene glycol (meth)acrylate, methoxy tetraethylene glycol (meth)acrylate, methoxy triethylene glycol (meth)acrylate, methoxy ethylene glycol (meth)acrylate, methoxy ethyl (meth)acrylate, glycidyl (meth)acrylate, glycerol (meth)acrylate, ethyl carbitol (meth)acrylate, 2-ethoxyethyl (meth)acrylate, N,N-dimethylaminoethyl (meth)acrylate, 2-cyanoethyl (meth)acrylate, a reaction product of butyl glycidyl ether and (meth)acrylic acid, butoxy triethylene glycol (meth)acrylate, and butanediol mono(meth)acrylate. These resins may be used alone or may be used in combinations of a plurality. These ultraviolet curable resins having no liquid crystallinity need to be added in such an amount that the compound containing the nematic liquid crystal monomer does not lose liquid crystallinity, and the amount added is preferably 0.1 to 20 parts by weight based on 100 parts by weight of the nematic liquid crystal monomer containing a polymerizable group or more preferably 1.0 to 10 parts by weight approximately.

When the polymerizable compound of the nematic liquid crystal monomer containing a polymerizable group described above is ultraviolet curable, a photopolymerization initiator is further added so that the composition containing them is cured by ultraviolet rays. Examples of the photopolymerization initiator include 2-methyl-1-[4-(methylthio)phenyl]-2-morpholinopropane-1 (Irgacure 907 manufactured by BASF Ltd.), 1-hydroxy cyclohexyl phenyl ketone (Irgacure 184 manufactured by BASF Ltd.), 4-(2-hydroxyethoxy)-phenyl(2-hydroxy-2-propyl) ketone (Irgacure 2959 manufactured by BASF Ltd.), 1-(4-dodecylphenyl)-2-hydroxy-2-methylpropane-1-one (Darocure 953 manufactured by Merck KGaA), 1-(4-isopropylphenyl)-2-hydroxy-2-methylpropane-1-one (Darocure 1116 manufactured by Merck KGaA), 2-hydroxy-2-methyl-1-phenylpropane-1-on (Irgacure 1173 manufactured by BASF Ltd.), an acetophenone compound such as diethoxyacetophenone, benzoin, benzoin compounds such as benzoin methyl ether, benzoin ethyl ether, benzoin isopropyl ether, benzoin isobutyl ether, and 2,2-dimethoxy-2-phenylacetophenone (Irgacure 651 manufactured by BASF Ltd.), benzophenone compounds such as benzoylbenzoic acid, methyl benzoylbenzoate, 4-phenylbenzophenone, hydroxybenzophenone, 4-benzoyl-4'-methyldiphenyl sulfide, and 3,3'-dimethyl-4-methoxybenzophenone (Kayacure MBP manufactured by Nippon Kayaku Co., Ltd.), and thioxanthone compounds such as thioxanthone, 2-chlorothioxanthone (Kayacure CTX manufactured by Nippon Kayaku Co., Ltd.), 2-methylthioxanthone, 2,4-dimethylthioxanthone (Kayacure RTX), isopropyl thioxanthone, 2,4-dichlorothioxanthone (Kayacure CTX manufactured by Nippon Kayaku Co., Ltd.), 2,4-diethylthioxanthone (Kayacure DETX manufactured by Nippon Kayaku Co., Ltd.), and 2,4-diisopropylthioxanthone (Kayacure DITX manufactured by Nippon Kayaku Co., Ltd.). The photopolymerization initiator is preferably, for example, Irgacure TPO, Irgacure TPO-L, Irgacure OXE01, Irgacure OXE02, Irgacure 1300, Irgacure 184, Irgacure 369, Irgacure 379, Irgacure 819, Irgacure 127, Irgacure 907, and Irgacure 1173 (all manufactured by BASF Ltd.), particularly preferably, Irgacure TPO, Irgacure TPO-L, Irgacure OXE01, Irgacure OXE02, Irgacure 1300, and Irgacure 907. These photopolymerization initiators may be used alone or may be used as a mixture of some of the initiators at an optional ratio.

When a benzophenone compound or a thioxanthone compound is used as the photopolymerization initiator, an auxiliary agent may be additionally used to promote optical polymerization reaction. Examples of such auxiliary agents include amine compounds such as triethanolamine, methyldiethanolamine, triisopropanolamine, n-butylamine, N-methyldiethanolamine, diethylaminoethyl methacrylate, Michler's ketone, 4,4'-diethylamino phenone, ethyl 4-dimethylaminobenzoate, (n-butoxy)ethyl 4-dimethylaminobenzoate, and isoamyl 4-dimethylaminobenzoate.

The added amounts of the photopolymerization initiator and the auxiliary agent are used in such a range that the liquid crystallinity of the composition containing the nematic liquid crystal monomer is not affected. The amount of the photopolymerization initiator added is preferably 0.5 to 10 parts by weight, more preferably 2 to 8 parts by weight, based on 100 parts by weight of ultraviolet-curable compound in the composition. The amount of the auxiliary agent added to the liquid crystal composition is preferably 0.5 to 2 times larger than the mass of the photopolymerization initiator.

The composition for forming the polymerizable liquid crystal layer of the quarter wave plate is capable of containing one or more additives such as a leveling agent, a defoaming agent, an ultraviolet absorbing agent, a photostabilizing agent, an oxidation inhibitor, a polymerization inhibitor, a crosslinking agent and the like as necessary so as to give the intended functions, respectively. The leveling agents include fluorine compounds, silicone compounds, and acrylic compounds, for example. The ultraviolet absorbing agents include benzotriazole compounds, benzophenone compounds, and triazine compounds, for example. The photostabilizing agents include hindered amine compounds, and benzoate compounds, for example. The oxidation inhibitors include phenol compounds, for example. The polymerization inhibitors include methoquinone, methyl hydroquinone, and hydroquinone, for example. The crosslinking agents include polyisocyanates such as alicyclic polyisocyanate, tolylene diisocyanate, xylylene diisocyanate, 4,4'-diphenylmethane diisocyanate and the like, and melamine compounds, for example. The added amounts of each of these additives are designed as appropriate in accordance with the function to be given.

(Support Substrate)

If the quarter wave plate includes a polymerizable liquid crystal layer, the liquid crystal composition constituting the polymerizable liquid crystal layer is coated on a support substrate. When the quarter wave plate is used in the HUD, it is preferable that such a support substrate is transparent in the visible light area in order to keep visibility of the display image and specifically, the visible light transmittance at the wavelength of 380 to 780 nm only needs to be 50% or more, preferably 70% or more or further preferably 85% or more. Moreover, the support substrate may be colored, but it is preferable that the support substrate is not colored or little colored. Furthermore, the refractive index of the support substrate is preferably 1.2 to 2.0 or more preferably 1.4 to 1.8. The thickness of the support substrate may be selected as appropriate in accordance with the application, and it is preferably 5 µm to 1000 µm, more preferably 10 µm to 250 µm or particularly preferably 15 µm to 150 µm.

The support substrate may be a single layer or a laminate of two layers or more. Examples of the support substrate include triacetylcellulose (TAC), acryl, polycarbonate, polyvinylchloride, polyolefin, polyethyleneterephthalate (PET) and the like. Among them, triacetylcellulose (TAC), polyolefin, acryl and the like with less birefringence are preferable.

Subsequently, by using the aforementioned nematic liquid crystal monomer having the polymerizable group, a method of manufacturing the quarter wave plate used in the present disclosure will be described. As such a method, the nematic liquid crystal monomer having the polymerizable group is dissolved in a solvent and then, the photopolymerization initiator is added, for example. Such a solvent is not particularly limited as long as it can dissolve the liquid crystal monomer to be used, but cyclopentanone, toluene, methylethylketone, methylisobutylketone and the like are cited, for example, and cyclopentanone, toluene, and the like are preferable. After that, this solution is coated on a plastic film such as a PET film, a TAC film or the like used as the support substrate so that the thickness becomes as uniform as possible and is left for a certain period of time under such a temperature condition that it becomes a liquid crystal and is aligned on the support substrate while the solvent is removed by heating. At this time, the orientation of the liquid crystal can be made more uniform by executing rubbing processing in a desired orientation direction before the coating on a plastic film surface or orientation processing such that a photo-alignment material exhibiting photo-alignment characteristics is made into a film on the plastic film surface and is subjected to polarized radiation or the like. As a result, the slow axis of the quarter wave plate can be controlled to a desired angle, and a haze value of the quarter wave plate can be reduced. Then, while this aligned state is maintained, the nematic liquid crystal monomer is irradiated by ultraviolet rays by a high-pressure mercury-vapor lamp or the like so as to fix the orientation of the liquid crystal, and the quarter wave plate having the desired slow axis can be obtained.

If the polymerizable liquid crystal monomer is constituted to be directly coated on the support substrate subjected to the orientation processing as above, that is, if the quarter wave plate has the polymerizable liquid crystal layer provided on the support substrate subjected to the orientation processing, since the support substrate acts similarly to a block layer which will be described later, it has a function of preventing drop of the phase difference value of the quarter wave plate. Since the quarter wave plate has such a constitution, a layer which could be a cause of change in the phase difference value such as an on-board intermediate film is not brought into direct contact with the polymerizable liquid crystal layer of the quarter wave plate and as a result, drop of the reflectance of the light reflection layer caused by the drop of the phase difference value of the quarter wave plate can be suppressed.

(Block Layer)

Figure 6:
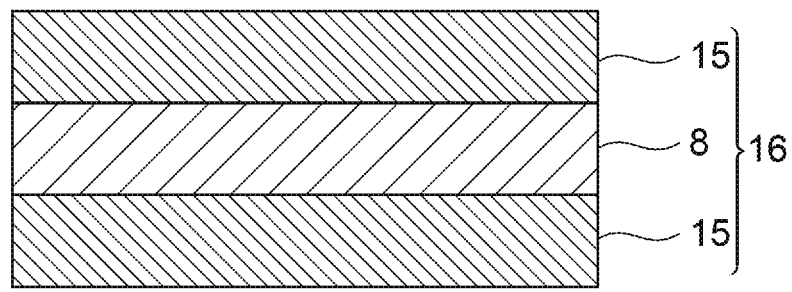
FIG. 6 A side sectional view illustrating an embodiment of the optical laminate used in the present disclosure.
Figure 7:
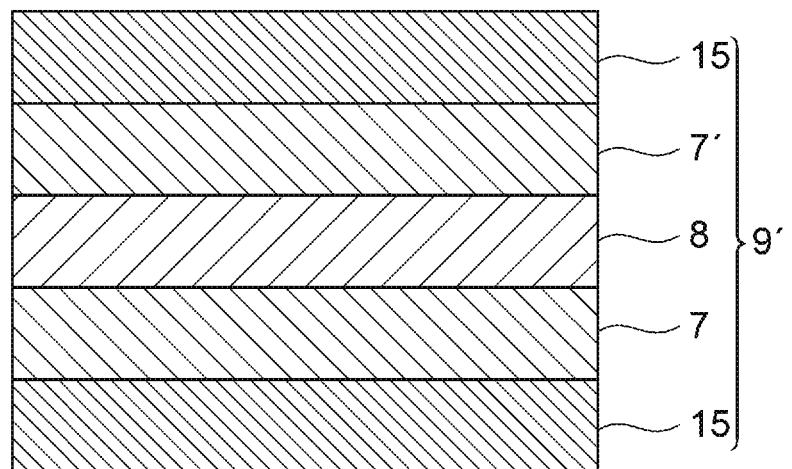
FIG. 7 A side sectional view illustrating an embodiment of a light control laminate used in the present disclosure.

The light control laminate used in the present disclosure may include a light control laminate in which a block layer is laminated on one surface or both surfaces of the light reflection layer. The block layer is a layer provided on the one surface or the both surfaces of the light reflection layer and is a cured film obtained by drying or curing a coating film formed of a resin composition, for example. When the light reflection layer is constituted by a cholesteric liquid crystal layer, in a state where the light reflection layer is left under a high temperature environment or under a use environment of the windshield of an automobile, for example, in a state of contact with the on-board intermediate film, the reflectance of the light reflection layer is lowered and the center reflection wavelength of the light reflection layer is shifted to the short wavelength side in some cases. This is considered to be caused by erosion by a material itself of the on-board intermediate film, a plasticizer contained in the on-board intermediate film or the like. The block layer can suppress the drop of the reflectance of the light reflection layer and the shift to the short wavelength of the center reflection wavelength by preventing such direct contact between the on-board intermediate film or the like and the light reflection layer as above. Durability of the optical laminate structure according to the present disclosure can be improved by using such an optical laminate and as a result, when the optical laminate structure containing the optical laminate in the HUD is used, the display image can be continuously projected brightly and clearly for a long time even under a severe environment. The block layer may be provided also on an outer side of the quarter wave plate other than it is provided between the light reflection layer and the quarter wave plate. FIG. 6 illustrates an example of the constitution of the optical laminate used in the present disclosure, and an optical laminate 16 has a constitution in which a block layer 15 is provided on the both surfaces of the light reflection layer 8, respectively. Moreover, FIG. 7 illustrates the light control laminate containing the block layer on the outer side of the quarter wave plate, and a light control laminate 9' illustrated in FIG. 7 has a constitution in which the block layer 15 is provided on the both surfaces of the light reflection layer 8 through the first quarter wave plate 7 and the second quarter wave plate 7', respectively. Moreover, if the quarter wave plate has a polymerizable liquid crystal layer provided on the support substrate subjected to the orientation processing, the support substrate acts similarly to the block layer. Thus, the support substrate prevents the material itself of the on-board intermediate film or the plasticizer contained in the on-board intermediate film from passing through the polymerizable liquid crystal layer of the quarter wave plate and eroding the cholesteric liquid crystal layer. That is, in the light control laminate having at least one quarter wave plate with such a constitution, since the action of the block layer is given to the quarter wave plate, the block layer does not have to be further provided on the outer side of this quarter wave plate. As a result, the performance become the highest, and drop of the reflectance of the light reflection layer and the shift to the short wavelength of the center reflection wavelength can be suppressed with a low cost.

The resin composition for forming the block layer contains one single or two types or more of resins selected from a group consisting of a polyvinyl alcohol resin, a polyester resin, a polyurethane resin, a polyamide resin, a polyimide resin, and an acrylic resin for example, and the block layer can be formed by coating and drying the resin composition. Such resins include Vylon 240 (manufactured by Toyobo Co., Ltd.), KAYAFLEX BPAM-01 (manufactured by Nippon Kayaku Co., Ltd.), UR-1700 (manufactured by Toyobo Co., Ltd.), UR-3210 (manufactured by Toyobo Co., Ltd.), Mowital B20H (manufactured by Kuraray Co., Ltd.), Mowital B60H (manufactured by Kuraray Co., Ltd.), Gohsenol Z200 (manufactured by Nippon Synthetic Chemical Industry Co., Ltd.), and PTR-3000 (manufactured by Nippon Kayaku Co., Ltd.), for example.

The resin composition for forming the block layer is an ultraviolet curable resin composition, a thermally curable resin composition or a mixture of them, for example, and the block layer can be obtained by coating and drying the curable resin composition and then, by curing it. It is preferable that such a curable resin composition is an ultraviolet curable resin composition from viewpoints of transparency, coating performance, and a production cost.

The ultraviolet curable resin composition contains at least the ultraviolet curable resin and the photopolymerization initiator and further contains more components arbitrarily. It is preferable that the ultraviolet curable resin contains at least one or two or more (meth)acryloyl group in a molecule, and it is selected from a group consisting of monofunctional (meth)acrylate, polyfunctional (meth)acrylate, polyfunctional urethane (meth)acrylate, polyfunctional epoxy (meth) acrylate, polyfunctional polyester (meth)acrylate, and polyfunctional tris (acryloxy ethyl) isocyanurate. They may be used alone or two types or may be used in combinations of two or more. By using these ultraviolet curable resins, drop of the reflectance of the light reflection layer can be prevented more effectively. Here, the (meth)acryloyl group indicates an acryloyl group or a methacryloyl group and means that they are present independently of each other in a molecule, and the "(meth)acrylate" means acrylate or methacrylate.

The monofunctional (meth)acrylates include 2-hydroxy-3-phenoxypropyl acrylate, isobornyl acrylate, phenoxydiethylene glycol acrylate, and N-acryloyl morpholine, for example.

The polyfunctional (meth)acrylates include 1,4-butanediol diacrylate, 1,6-hexanediol diacrylate, 1,9-nonanediol diacrylate, trimethylol propane di(meth)acrylate, dipentaerythritol di(meth)acrylate, polyethylene glycol di(meth)acrylate, tripropylene glycol di(meth)acrylate, di(meth)acrylate of epsilon-caprolactone adduct of hydroxypivalic acid neopentyl glycol (KAYARA DHX-220, HX-620, for example, manufactured by Nippon Kayaku Co., Ltd.), and di(meth) acrylate of EO adduct of bisphenol A, for example.

The polyfunctional urethane (meth)acrylates include urethane (meth)acrylates which are reactants among polyols such as ethylene glycol, 1,4-butanediol, polytetramethylene glycol, neopentyl glycol, polycaprolactone polyol, polyester polyol, polycarbonate diol or polytetramethylene glycol and the like, organic polyisocyanates such as hexamethylene diisocyanate, alicyclic polyisocyanate, tolylene diisocyanate, xylylene diisocyanate, 4,4'-diphenylmethane diisocyanate and the like, epsilon-caprolactone adduct of 2-hydroxyethyl(meth)acrylate, 2-hydroxypropyl(meth)acrylate, 1,4-butanediol mono(meth)acrylate, 2-hydroxyethyl(meth) acrylate or ethylene unsaturated compounds containing hydroxyl group such as pentaerythritol tri(meth)acrylate, for example.

The polyfunctional epoxy (meth)acrylates include bisphenol-A epoxy resin, bisphenol-F epoxy resin, phenol novolac epoxy resin, trisphenol methane epoxy resin, and epoxy (meth)acrylates which are reactants between polyglycidyl compounds such as polyethyleneglycol di-glycidyl ether, glycerin poly glycidyl ether or trimethylolpropane polyglycidyl ether and (meth)acryl acid, for example.

The polyfunctional polyester (meth)acrylates include polyester acrylates such as trimethylolpropane tri(meth) acrylate, trimethylolpropane polyethoxy tri(meth)acrylate, pentaerythritol tetra(meth)acrylate, pentaerythritol tri(meth) acrylate, ditrimethylol propane tetra(meth)acrylate, ditrimethylol propane tri(meth)acrylate, dipentaerythritol tri(meth) acrylate, dipentaerythritol tetra(meth)acrylate, dipentaerythritol penta(meth)acrylate, dipentaerythritol hexa(meth)acrylate, tripentaerythritol octa(meth)acrylate, for example.

The polyfunctional tris(acryloxyethyl) isocyanurates include tris(acryloxyethyl) isocianurate, tris allyl isocyanurate, for example.

As aforementioned ultraviolet curable resin, the block layer formed of a resin composition containing epoxy (meth) acrylate having two (meth)acryloyl groups or urethane (meth)acrylate having three or more (meth)acryloyl groups in a molecule in 5 weight % or more and 60 weight % or less or preferably 20 weight % or more and 50 weight % or less is preferable from a viewpoint of workability since adhesion with the light reflection layer and the quarter wave plate is satisfactory and also since curing shrinkage is small at ultraviolet curing, and moreover, since chips do not occur easily when the optical laminate structure according to the present disclosure is machined. Moreover, as the ultraviolet curable resin, the block layer formed of a resin composition containing a compound having at least three or more (meth)

acryloyl groups in a molecule in 5 weight % or more and 80 weight % or less or preferably 15 weight % or more and 70 weight % or less is preferable since the effect of preventing the drop of the reflectance of the light reflection layer caused by intrusion of plasticizers or the like is more improved. If the upper limit value of a content of the compound having the at least three or more (meth)acryloyl groups in a molecule is larger than 80 weight %, though block performance is excellent, the curing shrinkage is large and thus, workability is poor and adhesion with the light reflection layer and the quarter wave plate gets worse and moreover, chips occur easily when the optical laminate structure according to the present disclosure is machined. On the other hand, if the lower limit value of the content of the aforementioned compound is less than 5 weight %, block performance tends to decrease.

Moreover, when a resin with a relatively high glass transition temperature (Tg), a water-soluble resin or (meth)acrylate having three or more (meth)acryloyl groups in a molecule is used as the material for forming the block layer, it is preferable since a durability improvement effect of the light reflection layer is high. It is preferable that the glass transition temperature (Tg) is 80° C. or more and 300° C. or less, and 150° C. or more and 250° C. or less is more preferable. Particularly, in the water-soluble resin, the resin having the glass transition temperature at 100° C. or more, and (meth)acrylate having three or more (meth)acryloyl groups in a molecule, the effect of preventing drop of the reflectance of the light reflection layer is more prominent.

The photopolymerization initiators include benzoins such as benzoin, benzoin methyl ether, benzoin ethyl ether, benzoin isopropyl ether, benzoin isobutyl ether; acetophenones such as acetophenone, 2,2-diethoxy-2-phenylacetophenone, 1,1-dichloroacetophenone, 2-hydroxy-2-methyl-phenylpropane-1-one, diethoxyacetophenone, 1-hydroxycyclohexyl-phenylketone, 2-methyl-1-[4-(methylthio)phenyl]-2-morpholinopropane-1-one; anthraquinones such as 2-ethylanthraquinone, 2-t-butylanthraquinone, 2-chloroanthraquinone, 2-amylanthraquinone; thioxanthones such as 2,4-diethylthioxanthone, 2-isopropylthioxanthone, 2-chlorothioxanthone; ketals such as acetophenone dimethyl ketal, benzyl dimethyl ketal; benzophenones such as benzophenone, 4-benzoyl-4'-methyldiphenylsulfide, 4,4'-bismethylaminobenzophenone; and phosphine oxides such as 2,4,6-trimethylbenzoyl diphenylphosphine oxide, bis(2,4,6-trimethylbenzoyl)-phenylphosphine oxide.

Specific examples of the photopolymerization initiator include commercial products such as Irgacure 184 (1-hydroxy cyclohexyl phenyl ketone) and Irgacure 907 (2-methyl-1-(4-(methylthio)phenyl)-2-morpholinopropane-1-one) manufactured by Ciba Specialty Chemicals Ltd., Lucirin TPO (2,4,6-trimethylbenzoyl diphenylphosphine oxide) manufactured by BASF Ltd. They may be used alone or may be used in combinations of two or more.

It is preferable that the photopolymerization initiator is contained in a solid portion of the resin composition for forming the block layer in 0.01 weight % or more and 10 weight % or less or more preferably it is contained in 1 weight % or more and 7 weight % or less.

A solvent is further contained in the resin composition for forming the block layer. Such solvents are not particularly limited as long as it can dissolve the resin to be used and the photopolymerization activator and the like and include methyl ethyl ketone, methyl isobutyl ketone, isopropanol, cyclopentanone, water, and the like for example, and preferably are methyl ethyl ketone, cyclopentanone, and water. Moreover, these solvents can be added at an arbitrary ratio, and only one type can be added or a plurality of solvents can be used at the same time. These solvents are dried/removed in a drying process.

The resin composition for forming the block layer can further contain a curing accelerator. Examples of the curing accelerator include amines such as triethanol amine, diethanol amine, N-methyldiethanol amine, 2-methylaminoethyl benzoate, dimethylamino acetophenone, p-dimethylamino benzoate isoamino ester, EPA; and hydrogen donors such as 2-mercaptobenzothiazole. Contents of these curing accelerators are preferably 0 weight % or more and 5 weight % or less in a solid portion of the resin composition for forming the block layer.

Moreover, the resin composition for forming the block layer may contain one or more additives such as a leveling agent, a defoaming agent, an ultraviolet absorbing agent, a photostabilizing agent, an oxidation inhibitor, a polymerization inhibitor, a crosslinking agent and the like as necessary so as to give the intended functions, respectively. The leveling agents include fluorine compounds, silicone compounds, acrylic compounds, for example. The ultraviolet absorbing agents include benzotriazole compounds, benzophenone compounds, and triazine compounds, for example. The photostabilizing agents include hindered amine compounds, and benzoate compounds, for example. The oxidation inhibitors include phenol compounds, for example. The polymerization inhibitors include methoquinone, methyl hydroquinone, and hydroquinone, for example. The crosslinking agents include polyisocyanates such as alicyclic polyisocyanate, tolylene diisocyanate, xylylene diisocyanate, 4,4'-diphenylmethane diisocyanate and the like and melamine compounds, for example. The added amounts of each of these additives are designed as appropriate in accordance with the function to be given.

The thickness of the block layer is not particularly limited but an upper limit value of the thickness of the block layer constituted by the ultraviolet curable resin is preferably 50 μm and more preferably 20 μm from a viewpoint of curing contraction. On the other hand, the lower limit value of the thickness of the block layer constituted by the ultraviolet curable resin is preferably 0.1 μm and preferably 1 μm from a viewpoint of curing performance. When the thickness of the block layer is within a range of 0.1 μm or more and 50 μm or less, drop of the reflectance of the light reflection layer can be prevented more effectively. The block layer can be obtained by coating the resin composition for forming the block layer on the light reflection layer so that the film thickness after drying is within a range of 0.1 μm or more and 50 μm or less and then, after the coating film is dried, it is cured by ultraviolet radiation or heating so as to form a cured film.

The coating methods of the resin composition for forming the block layer are not particularly limited and include bar coater coating, wire bar coating, air knife coating, gravure coating, reverse gravure coating, micro gravure coating, micro reverse gravure coater coating, die coater coating, dip coating, spin coat coating, and spray coating, for example.

If the resin contained in the resin composition for forming the block layer is an ultraviolet curable resin, ultraviolet rays are irradiated for curing of the resin, but electron beams or the like can be also used. When the resin is cured by the ultraviolet rays, an ultraviolet irradiating device having a xenon lamp, a high-pressure mercury-vapor lamp, a metal halide lamp, or an LED can be used as a light source, and a light amount, arrangement of the light source and the like are adjusted as necessary. When the high-pressure mercury-vapor lamp is to be used, it is preferable that the resin is cured at a conveyance speed of 5 to 60 m/minute with respect to a single lamp having energy of 80 to 120 W/cm². On the other hand, if the resin is to be cured by electron beams, it is preferable that an electron beam accelerating device having energy of 100 to 500 eV is used, and at that time, the photopolymerization initiator does not have to be used.

As a method of forming the light control laminate containing the optical laminate, an optical laminate in which the block layer is laminated on the light reflection layer in advance is formed and then, this optical laminate may be sandwiched by two pieces of the quarter wave plates, or after the light reflection layer is laminated on one of the quarter wave plates and then, the block layer is formed on this light reflection layer, and then, another quarter wave plate may be laminated on the block layer. Alternatively, the block layer subjected to the orientation processing can be also used by executing the orientation processing such as rubbing processing on the surface of the block layer manufactured in advance or such that a film of a photo-alignment material exhibiting photo-alignment characteristics is formed on the surface of the block layer by polarized radiation and is subjected to the polarized radiation.

(Laminate for Laminated Glass)

Figure 8:
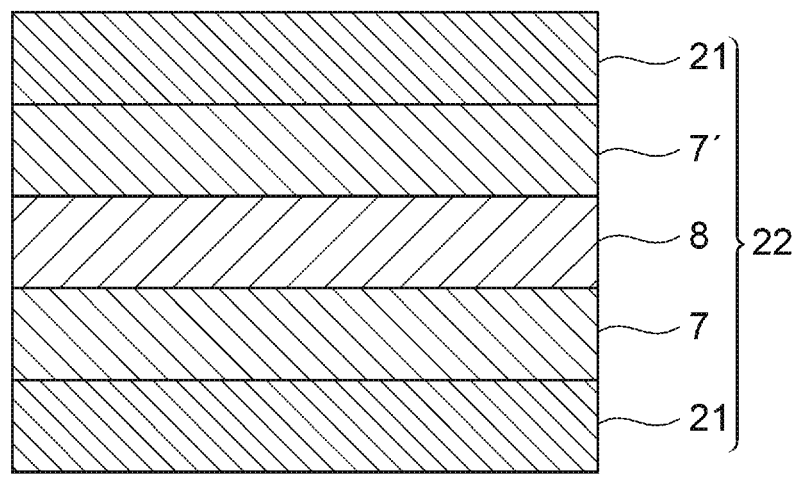
FIG. 8 A side sectional view illustrating an embodiment of a laminate for laminated glass used in the present disclosure.

The light control laminate used in the present disclosure may be a laminate for laminated glass made by laminating at least one intermediate film. FIG. 8 illustrates an embodiment of the laminate for laminated glass used in the present disclosure, and a laminated 22 for laminated glass has a constitution in which an intermediate film 21 is provided on the both surfaces of the light reflection layer 8 through the first quarter wave plate 7 and the second quarter wave plate 7'. In FIG. 8, the light control laminate is a laminate for laminated glass in which two pieces of the intermediate film are laminated so as to sandwich the first quarter wave plate and the second quarter wave plate, but the light control laminate may be a laminate for laminated glass in which a single intermediate film is laminated on either one of the first quarter wave plate or the second quarter wave plate.

If the light control laminate is a laminate for laminated glass in which two pieces of the intermediate films are laminated so as to sandwich the first quarter wave plate and the second quarter wave plate, it is preferable that the two pieces of the intermediate films are films formed by lamination. A method of laminating the intermediate film is not particularly limited but a method of laminating the intermediate film, the first quarter wave plate, the light reflection layer, the second quarter wave plate, and the intermediate film by carrying out crimping by using a nip roll at the same time can be cited. If the nip roll is capable of heating during lamination, it is possible to carry out crimping while heating. Moreover, if adhesion between the intermediate film and the quarter wave plate is poor, lamination may be carried out after surface processing such as corona processing or plasma processing is executed in advance.

(Intermediate Film)

As the intermediate film, a thermoplastic resin can be used, and it is preferable that an on-board intermediate film used in general is used. Such on-board intermediate films include a polyvinyl butyral resin (PVB), polyvinyl alcohol resin (PVA), or ethylene-vinyl acetate copolymer resin (EVA), for example. Among them, polyvinyl butyral resin is preferable. Moreover, the thickness of the intermediate film is not particularly limited as long as it is within a range not affecting reflection of display light and can be designed as appropriate in accordance with applications.

On the other hand, when the intermediate film is made of a PVB resin, in a state where the intermediate film and the light reflection layer made of the cholesteric liquid crystal are in contact, the light reflection layer is deteriorated under a high temperature condition, and the reflectance is lowered in some cases. This is considered to be because influences of erosion of the PVB resin itself adjacent to the light reflection layer made of the cholesteric liquid crystal, the plasticizer contained in the PVB resin, or the like. On the other hand, if the light control laminate used in the present disclosure contains the optical laminate, even if the intermediate film made of such PVB resin or the intermediate film made of the PVB resin containing the plasticizer are in direct contact, deterioration of the light reflection layer is suppressed, and a change in the reflectance can be suppressed.

Examples of the plasticizer which lowers the reflectance of the light reflection layer made of the cholesteric liquid crystal include organic ester plasticizers such as monobasic organic acid ester, polybasic organic acid ester and phosphoric plasticizers such as organic phosphoric plasticizer or organic phosphorous plasticizer, for example. The monobasic organic acid esters include glycol esters obtained by reaction between glycols such as triethylene glycol, tetraethylene glycol or tripropylene glycol and monobasic organic acids such as butyric acid, isobutyric acid, caproic acid, 2-ethyl-butyric acid, heptyl acid, n-octyl acid, 2-ethyl hexyl acid, pelargonic acid (n-nonylic acid) or decylic acid, for example.

The polybasic organic acid esters include ester compounds of polybasic organic acids such as adipic acid, sebacic acid, azelaic acid and alcohol having a straight chain or a branch structure with the carbon number of 4 to 8, for example. Such organic ester plasticizers include triethylene glycol-di-2-ethyl butyrate, triethylene glycol-di-2-ethylhexanoate, triethylene glycol dicaprylate, triethylene glycol-di-n-octanoate, triethylene glycol-di-n-heptanoate, tetraethylene glycol-di-2-ethylhexanoate, tetraethylene glycol-di-n-heptanoate, dibutyl sebacate, dioctyl azelate, dibutyl carbitol adipate, ethyleneglycol-di-2-ethyl butyrate, 1,3-propylene glycol-di-2-ethyl butyrate, 1/2-butyleneglycol-di-2-ethyl butyrate, diethylene glycol-di-2-ethyl butyrate, diethylene glycol-di-2-ethyl hexanoate, dipropylene glycol-di-2-ethyl butyrate, triethylene glycol-di-2-ethyl pentanoate, tetraethylene glycol-di-2-ethyl butyrate, diethylene glycol dicaprylate, triethylene glycol-di-n-heptanoate, tetraethylene glycol-di-n-heptanoate, triethylene glycol diheptanoate, tetraethylene glycol diheptanoate, dihexyl adipate, dioctyl adipate, hexylcyclohexyl adipate, a mixture of heptyl adipate and nonyl adipate, diisononyl adipate, heptylnonyl adipate, dibutyl sebacate, oil-modified alkyd sebacate, and a mixture of phosphate ester and adipate ester, for example.

The organic phosphoric plasticizers include tributoxyethylphosphate, isodecylphenylphosphate, and triisopropylphosphate, for example.

In the intermediate film, the ultraviolet absorbing agent, an anti-oxidizing agent, an antistatic agent, a thermal stabilizer, a coloring agent, an adhesion adjusting modifier and the like may be added and mixed as appropriate, and particularly, the intermediate film in which particles absorbing infrared rays are dispersed is important in manufacturing a high-performance thermal insulating laminated glass. As the particles absorbing infrared rays, metal selected from a group consisting of Sn, Ti, Zn, Fe, Al, Co, Ce, Cs, In, Ni, Ag, Cu, Pt, Mn, Ta, W, V, and Mo, metal oxides, metal nitrides, the aforementioned metal, metal oxides or metal nitrides doped with Sb or F, or ultrafine particles of materials having conductivity such as a composite containing at least two or more types of them can be used. Particularly, when the thermal insulating laminated glass is to be used as a window for construction or an automobile requiring transparency, tin-doped indium oxide (ITO), antimony-doped tin oxide (ATO), and fluorine-doped tin oxide which are transparent in a visible light area are particularly preferable. It is preferable that a grain size of the particle dispersed in the intermediate film and absorbing the infrared is 0.2 µm or less. If the grain size of the particle is 0.2 µm or less, the particles can absorb infrared rays while suppressing scattering of the light in the visible light area, and while electric-wave transmittance and transparency are ensured without generating a haze, the characteristics such as adhesion, transparency, durability and the like can be maintained equally to the intermediate film without addition and moreover, laminated glass processing can be executed in a work in an ordinary laminated glass manufacturing line. If PVB is to be used in the intermediate film, in order to keep a water content in the intermediate film optimally, laminating processing is executed in a room with a constant temperature and humidity. Moreover, in the intermediate film, a part thereof may be colored, a layer having a sound insulating function may be sandwiched, or in order to reduce occurrence of a double image in the HUD system, an object with inclination in the thickness (wedge shape) or the like may be used.

The intermediate film may be directly laminated on the one surface or the both surfaces of the light reflection layer or on the outer side of the quarter wave plate in a state dissolved in the solvent. When the polyvinyl butyral resin (PVB) is to be used, a lower limit value of a butyralization degree is preferably 40 mol %, more preferably 55 mol % or particularly preferably 60 mol %. On the other hand, an upper limit value of the butyralization degree is preferably 85 mol %, more preferably 80 mol %, or particularly preferably 75 mol %. The butyralization degree can be measured by an infrared absorption spectrum (IR) method and can be measured by using FT-IR, for example.

A lower limit value of a hydroxyl group amount of the polyvinyl butyral-based resin is preferably 15 mol %, and an upper limit value is preferably 35 mol %. If the hydroxyl group amount is less than 15 mol %, adhesion between the intermediate film for laminated glass and the glass is lowered or penetration resistance of the laminated glass is lowered in some cases. On the other hand, if the hydroxyl group amount exceeds 35 mol %, the intermediate film becomes hard in some cases.

The polyvinyl butyral-based resin can be prepared by acetalizing polyvinylalcohol with aldehyde. Polyvinylalcohol is usually obtained by saponifying polyvinyl acetate, and polyvinylalcohol with a saponification degree of 80 to 99.8 mol % is generally used. Moreover, an upper limit value of a polymerization degree of polyvinylalcohol is preferably 4000, more preferably 3000 or particularly preferably 2500. If the polymerization degree exceeds 4000, molding of the intermediate film becomes difficult in some cases.

(Functional Glass)

The light control laminate used in the present disclosure may be functional glass in which the first quarter wave plate and the second quarter wave plate are sandwiched by two pieces of glass plates. Such functional glass can be manufactured by further bonding the glass plate on the first quarter wave plate and the second quarter wave plate used in the present disclosure, respectively, or by bonding the glass plate on both surfaces of the laminate for laminated glass according to the present disclosure, for example. As a method of bonding the glass plates, an adhesive agent or a bonding agent is coated on each of the first quarter wave plate and the second quarter wave plate or on the both surfaces of the laminate for the laminated glass and then, by bonding the glass plates together. The adhesive agent or bonding agent is not particularly limited but if the glass plate might be peeled off later, a material having adhesion with excellent re-workability is preferable, and a silicone adhesive agent or an acrylic adhesive agent, for example, is preferable. The functional glass may have a constitution in which the glass plate is bonded to either one of the first quarter wave plate and the second quarter wave plate or a constitution in which the glass plate is bonded to one surface of the laminate for laminated glass.

The glass plate used in the present disclosure is not particularly limited as long as it has transparency by which a front scene can be sufficiently visually recognized even if the functional glass used in the present disclosure is used as a windshield, for example. Moreover, the refractive index of the glass plate is preferably 1.2 to 2.0 or more preferably 1.4 to 1.8. Moreover, the thickness, shape and the like of the glass plate are not particularly limited as long as it is within a range not affecting reflection of the display light and can be designed as appropriate in accordance with applications. Moreover, a reflection enhancing film made of a multi-layered film or a metal thin-film layer serving also as a thermal insulating function may be provided on a reflection surface in these glass plates. These films can improve the reflectance of the incident polarized light, but when the functional glass used in the present disclosure is used as a windshield for an automobile, it is preferable that the reflectance is adjusted so that a visible ray transmittance of the functional glass becomes 70% or more.

Figure 9:
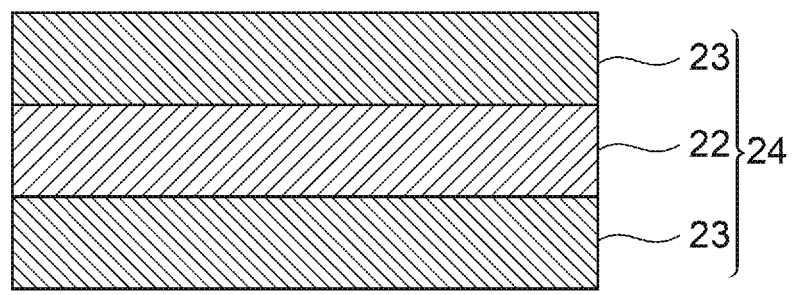
FIG. 9 A side sectional view illustrating an embodiment of a functional glass used in the present disclosure.

By arranging the laminate for laminated glass used in the present disclosure between two pieces of the glass plates and by crimping at a high temperature/high pressure, the functional glass in which the laminate for laminated glass is sandwiched by the two pieces of glass plates can be obtained. FIG. 9 illustrates an embodiment of the functional glass according to the present disclosure. A functional glass 24 illustrated in FIG. 9 has a constitution in which the laminate 22 for laminated glass is sandwiched by two pieces of glass plates 23, and the laminate 22 for laminated glass corresponds to the laminated body for laminated glass in FIG. 8, for example. Moreover, in FIG. 9, the light control laminate constituting the laminate 22 for laminated glass may include the optical laminate 16 in which the block layer 15 is laminated on the both surfaces of the light reflection layer 8 as in FIG. 6. As in FIG. 9, if the laminate 22 for laminated glass constitutes the functional glass 24, the intermediate film also has a function as an adhesive agent or a bonding agent for holding adhesion between the two pieces of the glass plates and the light control laminate.

Subsequently, an example of a method of manufacturing the functional glass by using the laminate for laminated glass will be described specifically. First, two pieces of the glass plates are prepared. For use as a laminated glass for windshield of an automobile, it is preferable that soda-lime glass made by a float method is used. The glass plate may be either of a transparent one or a one colored in green and is not particularly limited. Regarding the thickness of these glass plates, a glass plate with the thickness of approximately 2 mmt is usually used, but in response to a recent request for weight reduction of glass, a glass plate with a thickness slightly smaller than that can be also used. The glass plate is cut out to a predetermined shape, and an edge of the glass plate is chamfered and washed. If a frame shape in black color or a dot-shaped print is needed, it is printed on the glass plate. If a curved shape is needed such as in the case of a windshield, the glass plate is heated to 650° C. or more and then, shaped so that the two pieces have the same surface shapes by pressing using a mold or bending by its own weight, and the shaped glass is cooled. At this time, if a cooling speed is too fast, stress distribution occurs in the glass plate and makes tempered glass and thus, it is cooled gradually. One of the glass plates manufactured as above is placed horizontally, the aforementioned laminate for laminated glass is stacked on that, and another glass plate is further placed. Alternatively, such a method may be used that the intermediate film, the first quarter wave plate, the light reflection layer, the second quarter wave plate, and the intermediate film are laminated in order on the glass plate and lastly, another glass plate is placed. Subsequently, the light control laminate protruding from the edge of the glass plate is cut/removed by a cutter. After that, the light control laminate is heated to a temperature of 80° C. to 100° C. while air present between each layer and member is deaerated, and preliminary adhesion is carried out. There are two methods of deaerating air and they include a bag method carried out by wrapping the glass plate/intermediate film/ first quarter wave plate/light reflection layer/second quarter wave plate/intermediate film/glass plate, that is, the preliminary laminate of the glass plate/laminate for laminated glass/glass plate by a rubber bag made of heat-resistant rubber or the like and a ring method of covering and sealing only an end portion of the glass plate of the preliminary laminate by a rubber ring, and either one of the methods may be used. After the preliminary adhesion is finished, the preliminary laminate of the glass plate/laminate for laminated glass/glass plate taken out of the rubber bag or the preliminary laminate from which the rubber ring is removed is placed in an autoclave, heated to 120° C. to 150° C. under a high pressure of 10 to 15 kg/cm$^2$ and subjected to heating/ pressurization processing under this condition for 20 to 40 minutes. After the heating/pressurization processing, the preliminary laminate is cooled to 50° C. or less, is decompressed, and the functional glass made of the glass plate/ laminate for laminated glass/glass plate is taken out of the autoclave.

The functional glass obtained as above can be used as a windshield, a side glass, rear glass, and a roof glass of standard-sized vehicles, small-sized vehicles, and light duty vehicles as well as large-sized special vehicles, and small-sized special vehicles. Moreover, it can be also used as a window for railway vehicles, boats, and aircrafts or a window material for construction materials and industries. Moreover, the functional glass can be also used by laminating or bonding to a member having an UV cut function or a dimming function.

<Head-Up Display>

Figure 10:
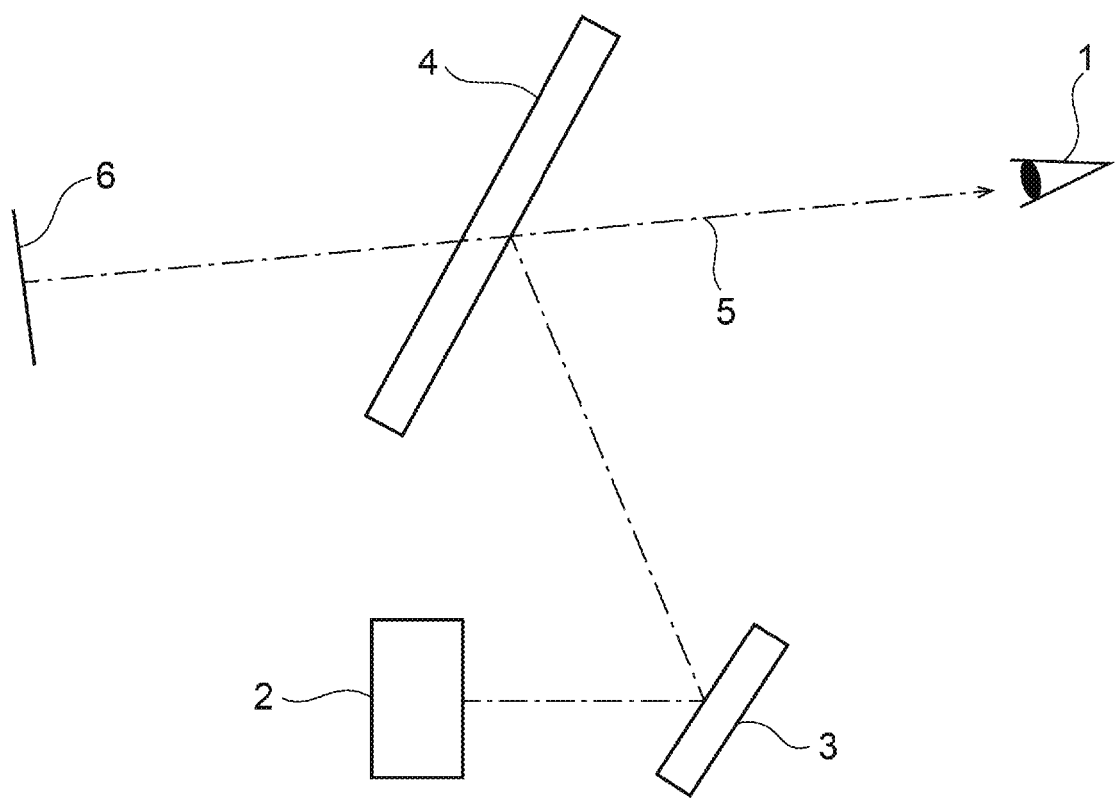
FIG. 10 A schematic view illustrating a first embodiment of a head-up display system according to the present disclosure.

FIG. 10 illustrates an example of the HUD system according to the present disclosure in a schematic view. The HUD system illustrated in FIG. 10 includes a display 2 projecting the display light showing a display image in P-polarized light or S-polarized light, a reflection mirror 3 reflecting the display light projected from the display 2, and an optical laminate structure 4 according to the present disclosure and to which the P-polarized light or S-polarized light projected from the display 2 is incident. By reflecting P-polarized light or S-polarized light projected from the display 2 by the reflection mirror 3, and by radiating this reflected display light to the optical laminate structure 4, the P-polarized light or S-polarized light reaches an observer 1 through an optical path 5 so that a virtual image 6 of the display image can be visually recognized. In the HUD system illustrated in FIG. 10, the display light projected from the display 2 is incident to the optical laminate structure 4 through the reflection mirror 3, but it may be incident directly to the optical laminate structure 4 from the display 2.

(Display)

Figure 11:
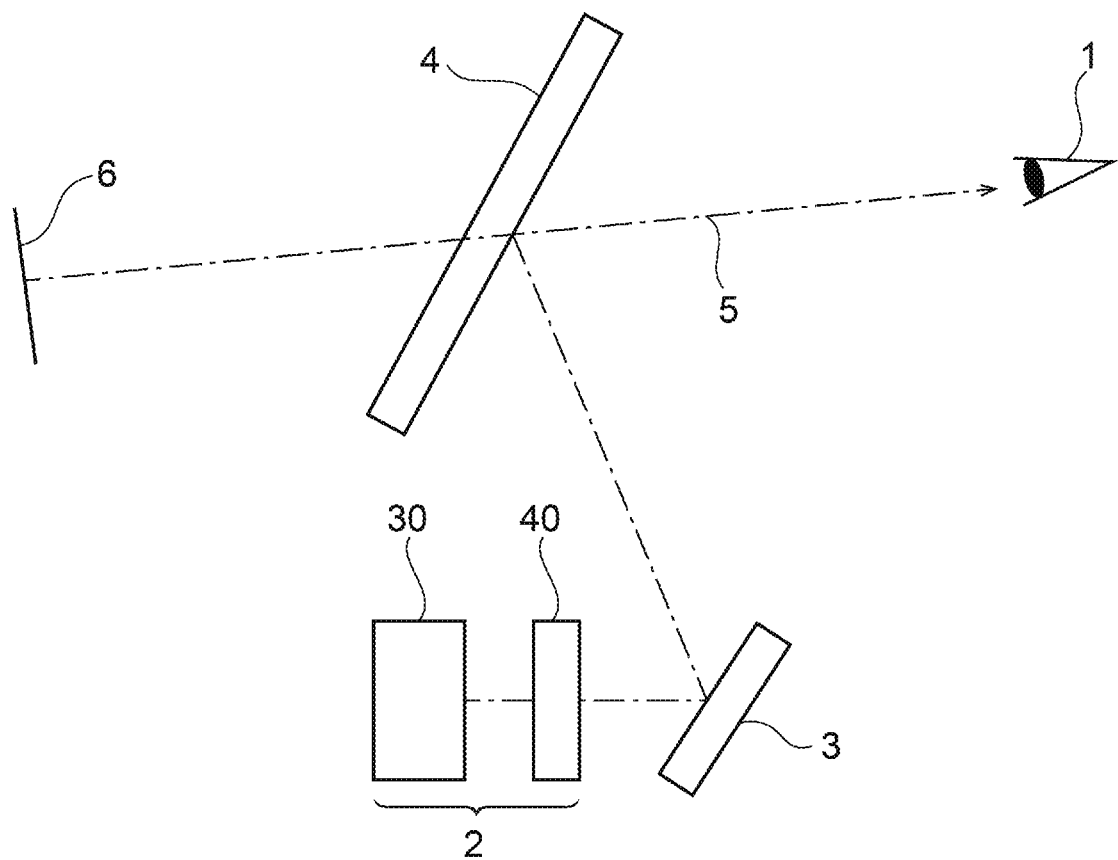
FIG. 11 A schematic view illustrating a second embodiment of a head-up display system according to the present disclosure.

The display 2 used in the HUD system according to the present disclosure is not particularly limited as long as desired P-polarized light or S-polarized light can be projected until it finally reaches the optical laminate structure 4, but a liquid crystal display (LCD), an organic EL display (OELD) and the like can be cited, for example. If the display 2 is a liquid crystal display device, since projected light is usually linearly polarized light, it can be used as it is. On the other hand, if the display 2 is an organic EL display, as illustrated in FIG. 11, the display 2 may be a HUD system constituted by a light source 30 and a polarization plate 40 capable of projecting P-polarized light or S-polarized light. Moreover, when the HUD system is used in an automobile, the liquid crystal display device or the organic EL display can be adjusted by arranging an optical member such as a polarization plate or a half wave plate at a light outlet such as a dashboard, for example, so that the P-polarized light or S-polarized light can be projected from the display 2. Moreover, the light source used in the display 2 is not particularly limited, either, and a laser light source, an LED light source and the like can be used. Moreover, by setting the center reflection wavelength of the light reflection layer so as to correspond to a emission spectrum of the aforementioned light source, the display image can be made clear more effectively. Moreover, as units for the polarization plate 40 to obtain specific polarization, a dye or iodine-based absorbing polarization plate can be used, for example.

(Reflection Mirror)

The HUD system according to the present disclosure may include a reflection mirror as necessary. The reflection mirror is not particularly limited as long as the display light from the display can be reflected toward the optical laminate structure and is constituted by a plane mirror, a concave mirror, and the like for example. When the concave mirror is used as the reflection mirror, the concave mirror can enlarge the display light from the display by a predetermined magnification ratio.

Figure 12:
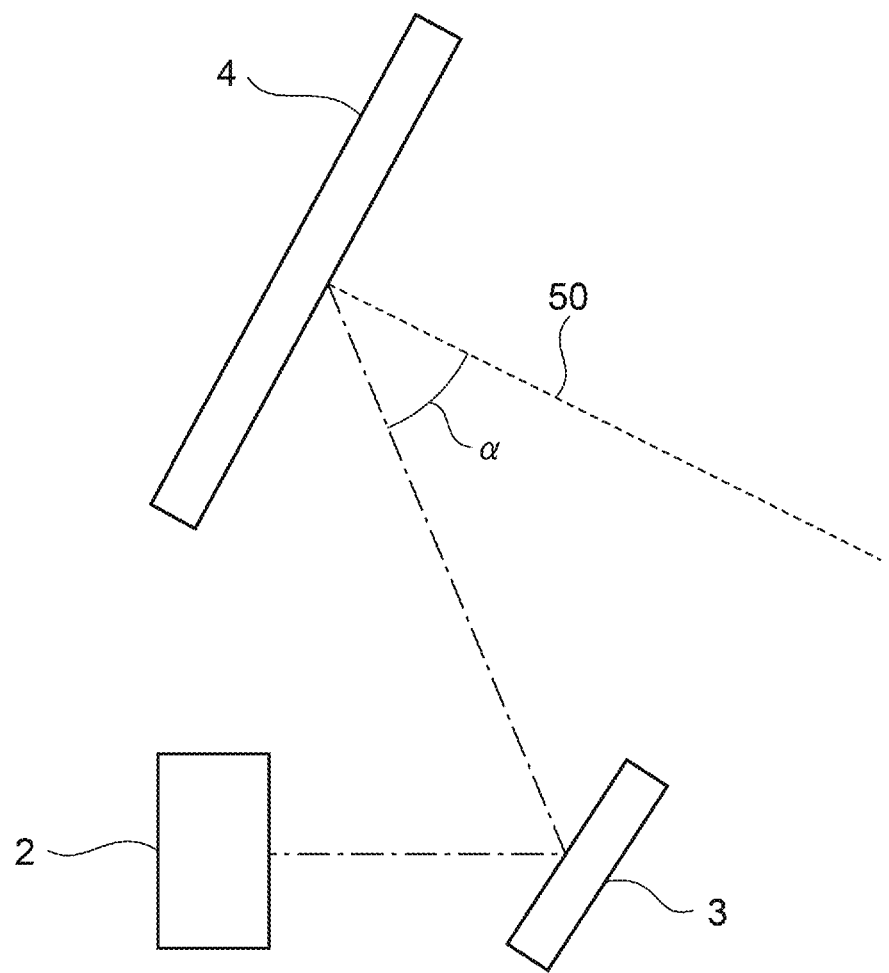
FIG. 12 A schematic view illustrating an outline of incidence of the P-polarized light to the optical laminate structure according to the present disclosure in the vicinity of Brewster's angle.

The HUD system according to the present disclosure is, as illustrated in FIG. 12, the display light projected from the display 2 is P-polarized light and moreover, assuming that a Brewster's angle of the P-polarized light to the optical laminate structure 4 is α, an incident angle of the P-polarized light incident to the optical laminate structure 4 is preferably within a range from α−10° to α+10° or more preferably within a range from α−5° to α+5°. By causing the P-polarized light from the display 2 to enter at the incident angle within a range from α−10° to α+10°, that is, in the vicinity of the Brewster's angle or preferably the Brewster's angle α to an axis 50 perpendicular to the surface of the optical laminate structure 4, reflection of the P-polarized light on the surface of the optical laminate structure is largely reduced. The P-polarized light transmitted through the optical laminate structure becomes the circularly polarized light on the first quarter wave plate and is reflected on the light reflection layer, converted again by the first quarter wave plate to the P-polarized light and this P-polarized light reaches the observer. The display image can be visually recognized by the observer as a virtual image. On the other hand, if the incident angle of the P-polarized light is less than α−10° or larger than α+10°, the incident angle of the P-polarized light is shifted from the vicinity of the Brewster's angle and thus, the reflectance of the P-polarized light increases and a double image is generated in some cases. As described above, by adjusting the incident angle of the P-polarized light to the vicinity of the Brewster's angle, occurrence of the double image can be largely reduced. Moreover, since the reflection light from the road surface is S-polarized light in general, polarization sunglasses are designed to absorb the S-polarized light. Thus, in the conventional HUD system using the S-polarized light, visibility of the display image of the HUD through the polarization sunglasses is extremely lowered. On the other hand, in the case of the HUD system using P-polarized light in which the P-polarized light reaches the observer, occurrence of the double image can be suppressed, and even when the polarization sunglasses are worn, visibility of the display image can be improved. Moreover, if the light reflection layer is made of the cholesteric liquid crystal layer, the circularly polarized light transmitted through the light reflection layer is converted to the original P-polarized light by the second quarter wave plate whose slow axis is installed in a positional relationship orthogonal to the slow axis of the first quarter wave plate. The converted P-polarized light is similarly incident even to an interface on the outer side of the second quarter wave plate in the vicinity of the Brewster's angle. Thus, the reflectance of the P-polarized light on the interface on the outer side of the second quarter wave plate can be also largely reduced, and as a result, occurrence of the double image is largely improved.

Moreover, in the windshield of the HUD system according to the present disclosure, if the optical laminate structure further containing the light reflection layer PRL-4 reflecting the near infrared area is used, angle dependence in the HUD is solved, and even if the observer observes the windshield from a diagonal direction, since the reflection wavelength area in the light reflection layer PRL-4 is shifted to a red-color area of the visible light from the near infrared area, the same display color as that in the front surface direction can be visibly recognized. Moreover, since the light reflection layer PRL-4 also has a thermal insulation effect, contribution can be also made to suppression of a temperature rise in the vehicle caused by incidence of sunlight.

As described above, the optical laminate structure according to the present disclosure can effectively improve the reflectance of specific polarized light while it has high visible light transmittance, visibility of the display image in the HUD can be improved, and particularly even if the visible light transmittance is legally restricted as the windshield, only the visibility of the display image in the HUD can be improved while required visible light transmittance is maintained. Moreover, since the optical laminate structure according to the present disclosure can brightly and clearly show the display image in the HUD over the whole surface of the windshield, a driver can visually recognize a clear display image at any portion in the windshield.

<Light Reflection Film>

Figure 13:
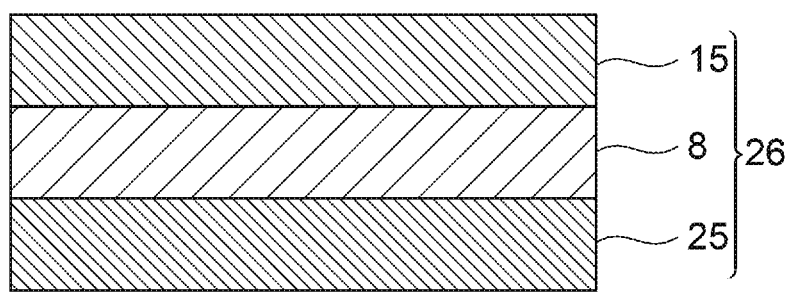
FIG. 13 A side sectional view illustrating an embodiment of a light reflection film according to the present disclosure.

As described above, if the light reflection layer is constituted by a cholesteric liquid crystal layer, if the light reflection layer is left under a high temperature environment in a state where the light reflection layer is in direct contact with the intermediate film, the reflectance of the light reflection layer is lowered and the center reflection wavelength of the light reflection layer is shifted to the short wavelength side in some cases. Thus, it is preferable that direct contact between the light reflection layer and the intermediate film is prevented. In another embodiment of the present disclosure, a light reflection film including an optical laminate in which at least one light reflection layer and a block layer laminated on one surface or both surfaces of the light reflection layer, the light reflection layer containing a cholesteric liquid crystal layer and is laminated on a plastic substrate, and the block layer being laminated at least on the cholesteric liquid crystal layer side of the light reflection layer is used. FIG. 13 illustrates an example of the constitution of the light reflection film according to the present disclosure. The light reflection film 26 illustrated in FIG. 13 has a constitution in which the light reflection layer 8 is laminated on a plastic substrate 25, and the block layer 15 is laminated on the light reflection layer 8. The plastic substrate 25, the light reflection layer 8, and the block layer 15 exhibit the aforementioned characteristics, respectively, and these materials are also selected in the aforementioned range. In the light reflection film according to the present disclosure, the light reflection layer is prevented from being brought into direct contact with the intermediate film by the block layer. Thus, drop of the reflectance of the light reflection layer under a high temperature atmosphere and a shift of the center reflection wavelength of the light reflection layer to the short wavelength can be suppressed. Such a light reflection film exhibits excellent durability even if it is arranged with the intermediate film.

The light reflection film according to the present disclosure may be an optical film in which an intermediate film is laminated on one surface or both surfaces of the light reflection film. The intermediate film used in the optical film exhibits the aforementioned characteristic, and a material of the intermediate film can be also selected within the aforementioned range. If the optical film has a constitution in which the intermediate film is laminated on the both surfaces of the light reflection film, for example, direct contact between the intermediate film and the light reflection layer is prevented by the block layer of the light reflection film for one of the intermediate films, while the direct contact between the intermediate film and the light reflection layer is prevented by the plastic substrate of the light reflection film for another of the intermediate films.

Moreover, in the light reflection film according to the present disclosure, the phase difference plate such as a ½ wavelength plate, a quarter wave plate or the like may be further laminated between the block layer and the light reflection layer of the optical laminate, on an outer-side surface of the plastic substrate or on both of them. The phase difference plate usually has a constitution in which a layer having an action of converting the polarized light of the polymerizable liquid crystal layer or the like is laminated on the support substrate such as TAC, acryl, polycarbonate, polyvinylchloride, polyolefin, PET or the like. When such a phase difference plate includes the polymerizable liquid crystal layer, if the polymerizable liquid crystal layer is left under a high temperature environment, a phase difference value of the phase difference plate is lowered in some cases. Here, the light reflection film according to the present disclosure has the block layer on one of the surfaces of the light reflection layer, and the phase difference plate includes the aforementioned support substrate. Therefore, even if such a phase difference plate is laminated between the block layer of the optical laminate and the light reflection layer, direct contact between the intermediate film and the polymerizable liquid crystal layer of the phase difference plate can be prevented by the block layer of the light reflation film. Moreover, even if such a phase difference plate is laminated on the outer-side surface of the plastic substrate, the direct contact between the intermediate film and the polymerizable liquid crystal layer of the phase difference plate can be prevented by the support substrate of the phase difference plate. By this action, even if the light reflection film according to the present disclosure further includes the aforementioned phase difference plate, drop of the phase difference value of the phase difference plate can be suppressed.

Moreover, by bonding the glass plate on the one surface or the both surfaces of the optical film including the light reflection film according to the present disclosure, the functional glass can be obtained. A method of bonding the optical film to the glass plate, characteristics and materials and the like of the glass plate can be selected within the aforementioned range. Since the light reflection film according to the present disclosure is used in such a functional glass, durability is excellent. Thus, a projected image can be continuously projected brightly and clearly even if the functional glass including the light reflection film according to the present disclosure is used as the display for HUD.

EXAMPLES

The present disclosure will be exemplified in detail by examples below. In the example, a term "part" means a part by weight.

[Preparation of Coating Liquid (Cholesteric Liquid Crystal Composition)]

A coating liquid (R1) having a composition shown in Table 1 was prepared.

TABLE 1

COMPOSITION TABLE OF COATING LIQUID (R1)

| MATERIAL (KIND) | MATERIAL NAME (MANUFACTURER) | AMOUNT ADDED (PARTS) |
| --- | --- | --- |
| POLYMERIZABLE LIQUID CRYSTAL | LC242 (BASF LTD.) | 20.00 |
| CHIRAL AGENT | LC756 (BASF LTD.) | 1.54 |
| PHOTO-POLYMERIZATION INITIATOR | Irgacure TPO (BASF LTD.) | 1.00 |
| SOLVENT | CYCLOPENTANONE | 80.00 |

Subsequently, coating liquids (R2), (R3), and (R4) with the similar prescription were prepared, respectively, except that an amount added of the chiral agent in the coating liquid (R1) was changed to the amount added indicated in Table 2.

TABLE 2

AMOUNT ADDED OF CHIRAL AGENT IN EACH COATING LIQUID (R2) TO (R4)

| COATING LIQUID | AMOUNT ADDED OF CHIRAL AGENT (PARTS) |
| --- | --- |
| COATING LIQUID (R2) | 1.26 |
| COATING LIQUID (R3) | 1.04 |
| COATING LIQUID (R4) | 0.70 |

Moreover, the coating liquid (QWP) having a composition shown in Table 3 used in preparation of the quarter wave plate was prepared.

TABLE 3

COMPOSITION TABLE OF COATING LIQUID (QWP)

| MATERIAL (KIND) | MATERIAL NAME (MANUFACTURER) | AMOUNT ADDED (PARTS) |
| --- | --- | --- |
| POLYMERIZABLE LIQUID CRYSTAL | LC242 (BASF LTD.) | 24.69 |
| PHOTO-POLYMERIZATION INITIATOR | Irgacure TPO (BASF LTD.) | 1.23 |
| LEVELING AGENT | BYK-349 (BYK KK) | 0.05 |
| SOLVENT | CYCLOPENTANONE | 74.07 |

Example 1

<Production of Light Control Laminate>

By using the prepared coating liquids (R1), (R2), (R3) and (R4), the light reflection layer PRL-1, the light reflection layer PRL-2, the light reflection layer PRL-3, and the light reflection layer PRL-4 are produced, respectively, in accordance with the following procedure and then, they were laminated so as to produce the light reflection layer. Subsequently, the quarter wave plate was further laminated on the both surfaces of the laminated light reflection layer so as to produce the light control laminate. As the plastic substrate, a PET film manufactured by Toyobo Co., Ltd. (product name: A4100, thickness: 50 μm) whose surface without undercoating layer was subjected to rubbing processing by a method described in Example 1 of Japanese Patent Laid-Open No. 2002-90743 in advance was used.

(1) Each coating liquid of the coating liquids (R1), (R2), (R3), and (R4) shown in Tables 1 and 2 was coated on the surface subjected to the rubbing processing of each PET film by using a wire bar at a room temperature so that a thickness of each light reflection layer obtained, respectively, after drying becomes 0.5 μm.

(2) Each of the obtained coating film was heated at 80° C. for 2 minutes so as to remove the solvent and to have a cholesteric liquid crystal phase. Subsequently, a high-pressure mercury-vapor lamp (manufactured by HARISON TOSHIBA LIGHTING Corporation) was made to radiate UV at an output of 120 W for 5 to 10 seconds so as to fix the cholesteric liquid crystal phase, and a cholesteric liquid crystal layer based on the coating liquids (R1), (R2), (R3), and (R4) was formed, respectively, on each PET film.

(3) The coating liquid (QWP) shown in Table 3 was coated on the surface subjected to the rubbing processing of each PET film by using the wire bar at a room temperature so that a thickness of each quarter wave plate obtained, respectively, after drying becomes 1 μm.

(4) Each of the obtained coating films (QWP) was heated at 80° C. for 2 minutes so as to remove the solvent and to have a liquid crystal phase. Subsequently, a high-pressure mercury-vapor lamp (manufactured by HARISON TOSHIBA LIGHTING Corporation) was made to radiate UV at an output of 120 W for 5 to 10 seconds so as to fix the liquid crystal phase, and eight pieces in total of the quarter wave plates formed on the PET film were produced. The phase difference value of the obtained quarter wave plate was measured by an automatic double refraction meter (manufactured by Oji Scientific Instruments Co., Ltd., "KOBRA-21ADH") and as a result, the phase difference value at 546 nm was 136 nm.

(5) The light reflection layer sides of the light reflection layer PRL-1 (using the coating liquid (R1)) and the light reflection layer PRL-2 (using coating liquid (R2)) on the PET films produced in (1) to (2) were laminated by using an acrylic adhesive agent (manufactured by Soken Chemical & Engineering Co., Ltd., acrylic adhesive agent SK-Dyne 906).

(6) The PET film of the light reflection layer PRL-2 was peeled off.

(7) The light reflection layer side of the light reflection layer PRL-3 (using the coating liquid (R3)) on the PET film produced in (1) to (2) and the light reflection layer side of the light reflection layer PRL-2 in (6) from which the PET film was peeled off were laminated by using the same acrylic adhesive agent as the adhesive agent used in (5).

(8) The light reflection layer side of the light reflection layer PRL-4 (using coating liquid (R4)) was laminated on the light reflection layer PRL-3 by the method similar to (7).

(9) The outer side of the light reflection layer PRL-1 and the PET film located on the outer side of the PRL-4 were peeled off, respectively, so as to produce the light reflection layer made of the cholesteric liquid crystal layer.

(10) Two pieces of the quarter wave plates on the PET film produced in (3) to (4) were used and laminated on the both surfaces of the produced light reflection layer by using the same acrylic adhesive agent as the adhesive agent used in (5). The lamination was carried out so that, in the two pieces of the quarter wave plates laminated on the both surfaces, an angle formed by the slow axis of the quarter wave plate on the side to which the P-polarized light or S-polarized light is incident and the polarization axis of the incident P-polarized light or S-polarized light becomes 25°, 30°, 35°, 40°, 45°, and 50°, and six pieces of the light control laminated bodies were produced.

Figure 14:
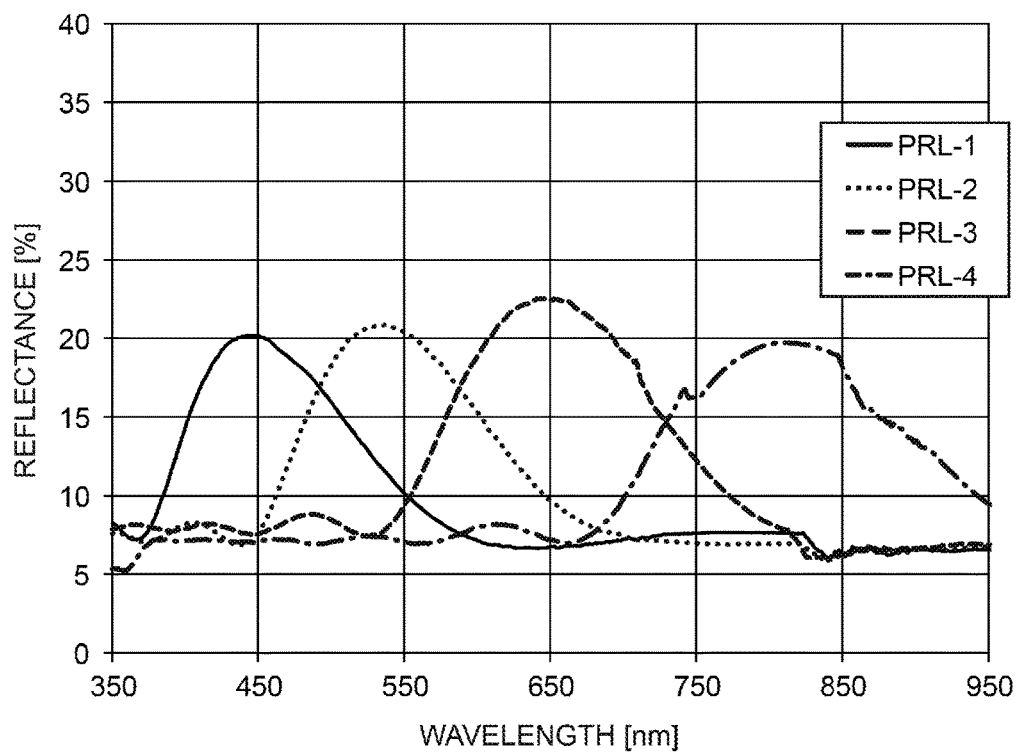
FIG. 14 A graph illustrating reflection characteristics of the light reflection layers PRL-1 to PRL-4 in Example 1.

As described above, the light reflection layer PRL-1, the light reflection layer PRL-2, the light reflection layer PRL-3, and the light reflection layer PRL-4 are laminated in this order, and the optical laminate structure having the quarter wave plates on the both surfaces was obtained. FIG. 14 is a view plotting a relationship between the wavelength and the reflectance when the single one of the light reflection layers PRL-1, PRL-2, PRL-3, and PRL-4 was formed. The center reflection wavelengths of the light reflection layers PRL-1, PRL-2, PRL-3, and PRL-4 were, as known from FIG. 14 and Table 4, 450 nm (the full width at half maximum is 123 nm), 540 nm (the full width at half maximum is 131 nm), 650 nm (the full width at half maximum is 148 nm), and 800 nm (the full width at half maximum is 178 nm), respectively, and the reflectance at the center reflection wavelengths of the light reflection layers PRL-1, PRL-2, PRL-3, and PRL-4 was approximately 20%, approximately 21%, approximately 22%, and approximately 20%, respectively.

TABLE 4

REFLECTION CHARACTERISTICS OF EACH LIGHT REFLECTION LAYER IN FIG. 14

| LIGHT REFLECTION LAYER | PRL-1 | PRL-2 | PRL-3 | PRL-4 |
|---|---|---|---|---|
| MAXIMUM REFLECTANCE (%) | 20.2 | 20.8 | 22.4 | 19.6 |
| CENTER REFLECTION WAVELENGTH $\lambda 2$ (nm) | 450 | 540 | 650 | 800 |
| 50% SHORT WAVELENGTH-SIDE WAVELENGTH (nm) | 397 | 479 | 578 | 722 |
| 50% LONG WAVELENGTH-SIDE WAVELENGTH (nm) | 520 | 610 | 726 | 900 |
| FULL WIDTH AT HALF MAXIMUM (nm) | 123 | 131 | 148 | 178 |

*BASE LINE OF REFLECTANCE OF EACH LIGHT REFLECTION LAYER: APPROXIMATELY 7%

Figure 15:
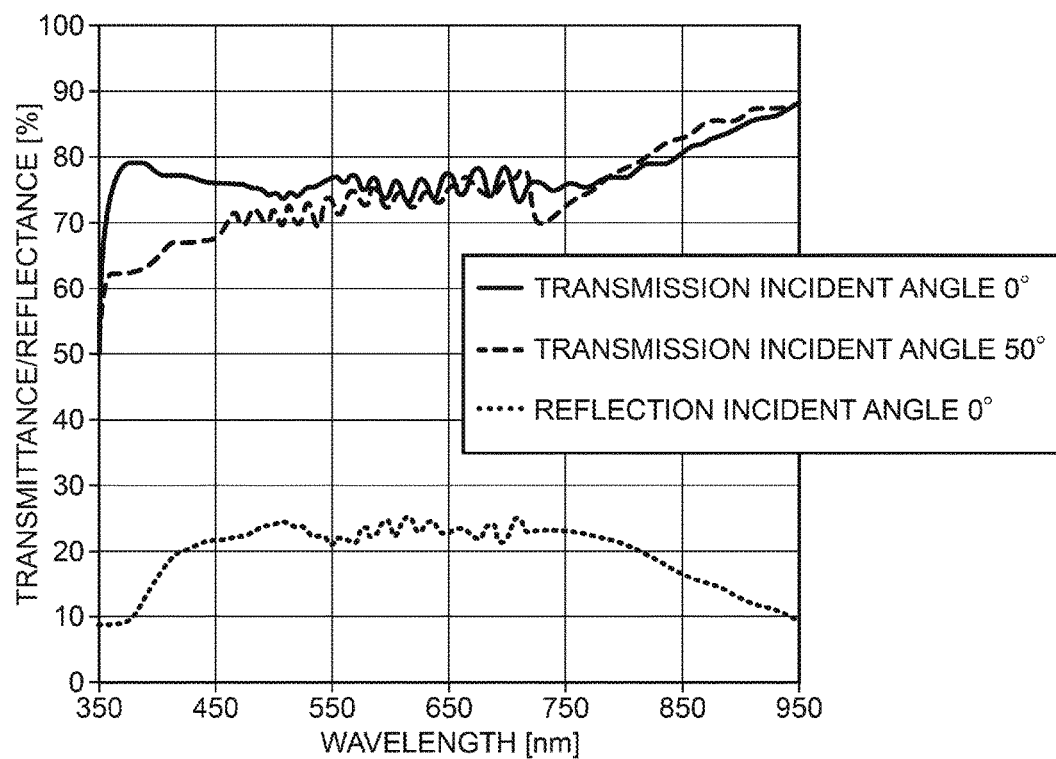
FIG. 15 A graph illustrating spectral characteristics of the light reflection layers in Example 1.

Spectral characteristics of the transmittance and the reflectance of the obtained light reflection layers are shown in FIG. 15. An average reflectance of the visible light in the front surface direction (incident angle 0°) of the light reflection layer was approximately 77%, and the reflectance in the vicinity of 550 nm was approximately 22%. Moreover, even when the obtained light reflection layer was seen from a position inclined from the front surface by 50°, there was no change in the transmittance of a red-color area, and a hue was similar to that in the front surface direction. Moreover, the phase difference value when the light reflection layer was inclined by 50° was measured by the automatic double refraction meter (manufactured by Oji Scientific Instruments Co., Ltd., "KOBRA-21ADH") and as a result, the phase difference value at 546 nm was 55 nm.

<Production of Laminate for Laminated Glass>

Two pieces of polyvinyl butyral intermediate films which were transparent with a thickness of 0.38 mm and contained triethylene glycol-di-2-ethylhexanoate as a plasticizer were used, the aforementioned light control laminate was arranged between the polyvinyl butyral intermediate films and then, it was pressurized and crimped by a laminator so that the laminate for laminated glass was obtained.

<Production of Functional Glass>

The aforementioned laminate for laminated glass was arranged between two pieces of glass plates each having a thickness of 2 mm and then, it was pressured/heated so as to obtain the functional glass. First, the laminate for laminated glass and the transparent glass plate were stacked in the order on the transparent glass plate. Subsequently, an excess portion of the laminate for laminated glass protruding from an edge portion of the glass plate was cut out/removed. This was wrapped with a rubber bag and deaerated for 10 minutes in an autoclave heated to 90° C., and preliminarily bonded. This was cooled to a room temperature and then, taken out of the rubber bag and was heated/pressurized again for 30 minutes in the autoclave at 135° C. under a high pressure of 12 kg/cm², and a functional glass into which a laminate for laminated glass having a favorable appearance was inserted was inserted was produced. The visible light transmittance of the obtained functional glass was 72%.

<Production of Head-Up Display and Evaluation of Display Image>

The head-up display was produced in arrangement as illustrated in FIG. 11. As the display 2, the light source 30 which is a liquid crystal projector and the polarization plate 40 which enables projection of the P-polarized light are installed, a commercial mirror was used for the reflection mirror 3, and the functional glass produced as above was used as the optical laminate structure 4. With respect to the polarization axis 18 of the P-polarized light incident as illustrated in FIG. 3, the slow axis 17 of the first quarter wave plate laminated on the light source side was arranged by inclination of approximately 35°. In this case, the slow axis 19 of the second quarter wave plate laminated on the surface opposite to the light source side is inclined by approximately −35° with respect to the polarization axis 18 of the P-polarized light. Subsequently, in a darkroom, the optical laminate structure 4 as the functional glass was arranged so that the incident angle of the P-polarized light becomes Brewster's angle (approximately) 56.7°) of the glass from the liquid crystal projector and when an image was projected, a double image was not observed in the display image, and there was no change in a color of the display image but it was projected extremely brightly and clearly. Moreover, when the display image was observed by wearing commercial polarization sunglasses (absorbing the S-polarized light), visibility of the display image was high, and an extremely clear display image could be visually recognized.

<Crossed Nichol Evaluation: Evaluation of Polarization Conversion Performance of Quarter Wave Plate>

Figure 16:
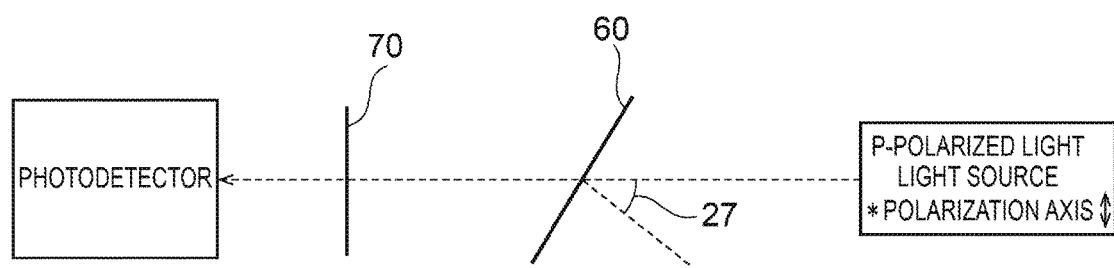
FIG. 16 A schematic view illustrating a measuring method of crossed Nichol measurement.

Crossed Nichol evaluation was made by a measuring method illustrated in FIG. 16 by using a spectrophotometer MPC-3100 manufactured by Shimadzu Corporation. In FIG. 16, the P-polarized light from the light source is projected to a measurement sample 60 at the incident angle 27, and a polarization plate 70 absorbing the S-polarized light is installed between a photodetector side and the measurement sample 60. In this measuring method, since the P-polarized light is made a light source, and the polarization plate absorbing the S-polarized light is installed on the photodetector side, the lower the light (average transmittance) detected by the photodetector is, the less the incident P-polarized light component is converted to the S-polarized light component even if it is transmitted through the measurement sample. That is, it can be determined that the polarization conversion performance is high. By using this measuring method, Crossed Nichol evaluation of the functional glass produced in Example 1 was made under a condition that the incident angle of the P-polarized light is 0°, 50°, 56°, and 65° so that the angle formed by the slow axis of the first quarter wave plate and the polarization axis of the incident P-polarized light becomes 25°, 30°, 35°, 40°, 45°, and 50°. The result is shown in Table 5. The average transmittance shown in Table 5 is an average transmittance in a visible light area from 400 nm to 700 nm, it can be determined as described above that the lower the average transmittance was, the less the incident P-polarized light component was not converted to the S-polarized light component even if it was transmitted through the measurement sample.

TABLE 5

CROSSED NICHOL EVALUATION RESULT

| | | INCIDENT ANGLE OF P-POLARIZED LIGHT | | | |
|---|---|---|---|---|---|
| | | 0° | 50° | 56° | 65° |
| ANGLE θ FORMED BY SLOW AXIS OF FIRST QUARTER WAVE PLATE AND POLARIZATION AXIS OF P-POLARIZED LIGHT INCIDENT AT ARBITRARY ANGLE | 50° | 10.0% | 26.3% | 27.8% | 29.3% |
| | 45° | 3.8% | 7.3% | 13.7% | 20.2% |
| | 40° | 6.3% | 1.3% | 4.3% | 7.3% |
| | 35° | 17.7% | 2.9% | 2.7% | 2.4% |
| | 30° | 27.3% | 7.4% | 6.4% | 5.3% |
| | 25° | 30.3% | 10.1% | 8.0% | 5.8% |

Comparative Example 1

The evaluation similar to the evaluation of the display image in Example 1 was made except that the angle θ formed by the slow axis of the first quarter wave plate and the polarization axis of the incident P-polarized light was changed from 35° to 50°. As a result, when the display image was projected from a liquid crystal projector to the functional glass, the display image was darker than Example, and visibility was totally low.

Example 2

The method similar to that in Example 1 was carried out except that a thickness of the light reflection layer of each of the light reflection layers PRL-1 to PRL-4 was made larger to 1 μm, and eight pieces of the functional glass were produced so that the angle formed by the slow axis of the first quarter wave plate and the polarization axis of the incident P-polarized light becomes 15°, 20°, 25°, 30°, 35°, 40°, 45°, and 50°. The phase difference value of the light reflection layer included in the obtained functional glass when it was inclined by 50° was measured by an automatic double refraction meter (manufactured by Oji Scientific Instruments Co., Ltd., "KOBRA-21ADH") and as a result, the phase difference value at 546 nm was 70 nm. The Crossed Nichol evaluation was made by the method similar to that in Example 1, and the result is shown in Table 6.

TABLE 6

CROSSED NICHOL EVALUATION RESULT

| | | INCIDENT ANGLE OF P-POLARIZED LIGHT | | | |
|---|---|---|---|---|---|
| | | 0° | 50° | 56° | 65° |
| ANGLE θ FORMED BY SLOW AXIS OF FIRST QUARTER WAVE PLATE AND POLARIZATION AXIS OF P-POLARIZED LIGHT INCIDENT AT ARBITRARY ANGLE | 50° | 3.9% | 25.9% | 29.5% | 33.2% |
| | 45° | 1.2% | 12.0% | 18.0% | 23.9% |
| | 40° | 8.6% | 3.8% | 9.1% | 14.4% |
| | 35° | 19.4% | 1.2% | 3.3% | 5.4% |
| | 30° | 30.1% | 2.5% | 2.2% | 1.9% |
| | 25° | 31.5% | 3.6% | 2.1% | 0.6% |
| | 20° | 27.8% | 5.7% | 3.5% | 1.2% |
| | 15° | 27.1% | 9.2% | 6.3% | 3.4% |

Example 3

The method similar to that in Example 1 was carried out except that a thickness of the light reflection layer of each of the light reflection layers PRL-1 to PRL-4 was made larger to 1.5 μm, and seven pieces of the functional glass were produced so that the angle formed by the slow axis of the first quarter wave plate and the polarization axis of the incident P-polarized light becomes 10°, 15°, 20°, 25°, 30°, 35°, and 40°. The phase difference value of the light reflection layer included in the obtained functional glass when it was inclined by 50° was measured by an automatic double refraction meter (manufactured by Oji Scientific Instruments Co., Ltd., "KOBRA-21ADH") and as a result, the phase difference value at 546 nm was 90 nm. The Crossed Nichol evaluation was made by the method similar to that in Example 1, and the result is shown in Table 7.

TABLE 7

CROSSED NICHOL EVALUATION RESULT

| | | INCIDENT ANGLE OF P-POLARIZED LIGHT | | | |
|---|---|---|---|---|---|
| | | 0° | 50° | 56° | 65° |
| ANGLE θ FORMED BY SLOW AXIS OF FIRST QUARTER WAVE PLATE AND POLARIZATION AXIS OF P-POLARIZED LIGHT INCIDENT AT ARBITRARY ANGLE | 40° | 3.1% | 16.9% | 23.6% | 30.3% |
| | 35° | 18.9% | 2.6% | 9.3% | 16.0% |
| | 30° | 30.5% | 0.9% | 3.7% | 6.6% |
| | 25° | 30.7% | 8.3% | 5.2% | 2.1% |
| | 20° | 22.3% | 0.9% | 1.9% | 2.8% |
| | 15° | 19.2% | 3.2% | 1.9% | 0.6% |
| | 10° | 19.6% | 2.3% | 1.6% | 0.9% |

The value of θ calculated when the incident angle of the P-polarized light to the functional glass which is the optical laminate structure is 0°, 50°, 56°, and 65° was acquired by the following expressions (1) and (2). As a result, the values of θ to the incident angle of the P-polarized light of 0°, 50°, 56°, and 65° were 45°, 41°, 40°, and 39°, respectively. It was assumed that the refractive index of air was 1.00, and the refractive index of the quarter wave plate was 1.55. From Table 7, if the incident angle of the P-polarized light is 0°, the value of the angle θ formed by the slow axis of the first quarter wave plate and the polarization axis of the P-polarized light incident at an angle of 0° when polarization conversion performance is the highest is 40°, and if the incident angle of the P-polarized light is 50°, the polarization conversion performance is the highest when the value of the angle θ is 20° or 30°. Moreover, if the incident angle of the P-polarized light is 56° and 65°, the polarization conversion performance is the highest when the angle θ is 10° or 15°, and they were both within the range of the value of θ calculated by the following formulas (1) and (2) to 5°. In Examples 2 and 3, the total thickness of the cholesteric liquid crystal layer is made larger as shown in Tables 6 and 7, and the phase difference value in the thickness direction of the cholesteric liquid crystal layer is increased and thus, the optimal angle gets closer to 0° as compared with Example 1, but in either case, the optimal angle was within the range of the value of θ calculated by the following expressions (1) and (2) to 5°.

$$\tan\theta = \cos\beta \quad (1)$$

$$\beta = \sin^{-1}\left(\sin\alpha \cdot \frac{n_\alpha}{n_\beta}\right) \quad (2)$$

θ: an angle formed by the slow axis of the first quarter wave plate and the polarization axis of S-polarized light or P-polarized light incident to the light control laminate at an arbitrary incident angle α

α: an incident angle of S-polarized light or P-polarized light to the light control laminate $n_\alpha$: refractive index of air $n_\beta$: refractive index of the first quarter wave plate As the result of comparison between Example 1 and Comparative Example 1, if the angle θ formed by the slow axis of the quarter wave plate and the polarization axis of the incident P-polarized light was out of the range specified by the present disclosure, when the incident P-polarized light was transmitted through the light control laminate, the P-polarized light component was converted to the S-polarized light component and thus, the S-polarized light was reflected on the glass plate interface on the opposite surface, and visibility was lowered.

From the above, it is known that the S-polarized light or P-polarized light incident at an arbitrary incident angle can be returned to the original S-polarized light or P-polarized light more efficiently by using the optical laminate structure according to the present disclosure and thus, the optical laminate structure exhibiting excellent polarization conversion performance is obtained. Moreover, by applying the optical laminate structure according to the present disclosure to the HUD system, an extremely clear display image can be visibly recognized.

<Durability Test>

The following operation was carried out, and durability of the light reflection film according to the present disclosure was evaluated.

[Preparation of Coating Liquid (Cholesteric Liquid Crystal Composition)]

The coating liquid having the composition shown in Table 8 was prepared.

TABLE 8

| COMPOSITION TABLE OF COATING LIQUID (R5) | | |
|---|---|---|
| MATERIAL (KIND) | MATERIAL NAME (MANUFACTURER) | AMOUNT ADDED (PARTS) |
| POLYMERIZABLE LIQUID CRYSTAL | LC242 (BASF LTD.) | 20.00 |
| CHIRAL AGENT | LC756 (BASF LTD.) | 1.26 |
| PHOTO-POLYMERIZATION INITIATOR | Irgacure TPO (BASF LTD.) | 1.00 |
| LEVELING AGENT | BYK-349 (BYK KK) | 0.05 |
| SOLVENT | TOLUENE | 80.00 |

Example 4 to Example 35

<Production of Light Reflection Film>

The light reflection layer was produced by the following procedure by using the prepared coating liquid (R5) and then, they were laminated and the light reflection layer was produced. As the plastic substrate, the PET film (product name: A4100, thickness: 50 μm) manufactured by Toyobo Co., Ltd. in which a surface without an undercoating layer was subjected to rubbing processing in advance in accordance with the method described in Example 1 of Japanese Patent Laid-Open No. 2002-90743 was used.

(1) The coating liquid shown in Table 8 was coated on the surface subjected to the rubbing processing of each PET film by using a wire bar at a room temperature so that a thickness of each light reflection layer obtained, respectively, after drying becomes 0.5 μm.

(2) Each of the obtained coating film was heated at 80° C. for 1 minute so as to remove the solvent and to have a cholesteric liquid crystal phase. Subsequently, a high-pressure mercury-vapor lamp (manufactured by HARISON TOSHIBA LIGHTING Corporation) was made to radiate UV at an output of 120 W for 5 to 10 seconds so as to fix the cholesteric liquid crystal phase, and the light reflection layer made of a cholesteric liquid crystal layer based on the coating liquid (R5) was formed, respectively, on each PET film.

(3) On the surface of the light reflection layer on each PET film produced in (1) to (2), the coating liquid for forming the block layer shown in Examples 4 to 35 in Tables 9 and 10 was coated so that a thickness of each light reflection layer obtained, respectively, after drying becomes 5 μm.

(4) The coating film was heated at 40° C. for 3 minutes so as to remove the solvent and then, the high-pressure mercury-vapor lamp (manufactured by HARISON TOSHIBA LIGHTING Corporation) was made to radiate UV at an output of 120 W for 5 to 10 seconds so as to laminate the block layer on the light reflection layer, and the light reflection film having the block layer on the light reflection layer was produced.

TABLE 9

COMPOSITION TABLE OF COATING LIQUID FOR FORMING BLOCK LAYER IN EXAMPLES 4 TO 26

| MATERIAL (KIND) | MATERIAL NAME (MANUFACTURER) | Tg OF HOMO-POLYMER (CATALOG REFERENCE) | COMPATIBILITY WITH WATER | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|
| | | | | AMOUNT ADDED (PARTS BY WEIGHT) | | | | | | |
| MONOFUNCTIONAL ACRYLATE | KAYARAD RM-1001 (NIPPON KAYAKU CO., LTD.) | 107° C. | WATER SOLUBILITY | 100 | | | | | | |
| | IBXA (OSAKA ORGANIC CHEMICAL INDUSTRY LTD.) | 97° C. | WATER INSOLUBILITY | | 100 | | | | | |
| | KAYARAD R-128H (NIPPON KAYAKU CO., LTD.) | 38° C. | WATER INSOLUBILITY | | | 100 | | | | |
| | PHE-2D (DKS CO., LTD.) | −35° C. | WATER INSOLUBILITY | | | | 100 | | | |
| BIFUNCTIONAL ACRYLATE | KAYARAD HX-220 (NIPPON KAYAKU CO., LTD.) | 13° C. | WATER INSOLUBILITY | | | | | 100 | | |
| | KAYARAD R-167 (NIPPON KAYAKU CO., LTD.) | 28° C. | WATER INSOLUBILITY | | | | | | 100 | |
| | KAYARAD R-664 (NIPPON KAYAKU CO., LTD.) | 180° C. | WATER INSOLUBILITY | | | | | | | 100 |
| BIFUNCTIONAL URETHANE ACRYLATE | KAYARAD UX-3204 (NIPPON KAYAKU CO., LTD.) | −14° C. | WATER INSOLUBILITY | | | | | | | |
| BIFUNCTIONAL EPOXY ACRYLATE | KAYARAD R-115 (NIPPON KAYAKU CO., LTD.) | 118° C. | WATER INSOLUBILITY | | | | | | | |
| TRIFUNCTIONAL ACRYLATE | KAYARAD PET 30 (NIPPON KAYAKU CO., LTD.) | 250° C. OR MORE | WATER INSOLUBILITY | | | | | | | |
| SIX-FUNCTIONAL ACRYLATE | KAYARAD DPCA-20 (NIPPON KAYAKU CO., LTD.) | 57° C. | WATER INSOLUBILITY | | | | | | | |
| FIVE-FUNCTIONAL ACRYLATE | KAYARAD D-310 (NIPPON KAYAKU CO., LTD.) | 70° C. | WATER INSOLUBILITY | | | | | | | |
| SIX-FUNCTIONAL URETHANE ACRYLATE | KAYARAD UX-5000 (NIPPON KAYAKU CO., LTD.) | 97° C. | WATER INSOLUBILITY | | | | | | | |
| PHOTOPOLYMERIZATION INITIATOR | Irgacure 907 (BASF LTD.) | | | 5 | 5 | 5 | 5 | 5 | 5 | 5 |
| | DAROCUR TPO (BASF LTD.) | | | 1 | 1 | 1 | 1 | 1 | 1 | 1 |
| SOLVENT | METHYLETHYLKETONE | | | 100 | 100 | 100 | 100 | 100 | 100 | 100 |

| MATERIAL (KIND) | MATERIAL NAME (MANUFACTURER) | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
|---|---|---|---|---|---|---|---|---|---|
| | | AMOUNT ADDED (PARTS BY WEIGHT) | | | | | | | |
| MONOFUNCTIONAL ACRYLATE | KAYARAD RM-1001 (NIPPON KAYAKU CO., LTD.) | | 20 | 50 | 80 | | | | |
| | IBXA (OSAKA ORGANIC CHEMICAL INDUSTRY LTD.) | | | | | | | | |
| | KAYARAD R-128H (NIPPON KAYAKU CO., LTD.) | | | | | | | | |
| | PHE-2D (DKS CO., LTD.) | | 80 | 50 | 20 | 80 | 50 | 20 | |

TABLE 9-continued

COMPOSITION TABLE OF COATING LIQUID FOR FORMING BLOCK LAYER IN EXAMPLES 4 TO 26

| MATERIAL (KIND) | MATERIAL NAME (MANUFACTURER) | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
|---|---|---|---|---|---|---|---|---|---|
| | | AMOUNT ADDED (PARTS BY WEIGHT) | | | | | | | |
| BIFUNCTIONAL ACRYLATE | KAYARAD HX-220 (NIPPON KAYAKU CO., LTD.) | | | | | | 20 | 50 | 80 |
| | KAYARAD R-167 (NIPPON KAYAKU CO., LTD.) | | | | | | | | |
| | KAYARAD R-664 (NIPPON KAYAKU CO., LTD.) | | | | | | | | |
| BIFUNCTIONAL URETHANE ACRYLATE | KAYARAD UX-3204 (NIPPON KAYAKU CO., LTD.) | 100 | | | | | | | |
| BIFUNCTIONAL EPOXY ACRYLATE | KAYARAD R-115 (NIPPON KAYAKU CO., LTD.) | | | | | | | | 100 |
| TRIFUNCTIONAL ACRYLATE | KAYARAD PET 30 (NIPPON KAYAKU CO., LTD.) | | | | | | | | |
| SIX-FUNCTIONAL ACRYLATE | KAYARAD DPCA-20 (NIPPON KAYAKU CO., LTD.) | | | | | | | | |
| FIVE-FUNCTIONAL ACRYLATE | KAYARAD D-310 (NIPPON KAYAKU CO., LTD.) | | | | | | | | |
| SIX-FUNCTIONAL URETHANE ACRYLATE | KAYARAD UX-5000 (NIPPON KAYAKU CO., LTD.) | | | | | | | | |
| PHOTOPOLYMERIZATION INITIATOR | Irgacure 907 (BASF LTD.) | 5 | 5 | 5 | 5 | 5 | 5 | 5 | 5 |
| | DAROCUR TPO (BASF LTD.) | 1 | 1 | 1 | 1 | 1 | 1 | 1 | 1 |
| SOLVENT | METHYLETHYLKETONE | 100 | 100 | 100 | 100 | 100 | 100 | 100 | 100 |

| MATERIAL (KIND) | MATERIAL NAME (MANUFACTURER) | EXAMPLE 19 | EXAMPLE 20 | EXAMPLE 21 | EXAMPLE 22 | EXAMPLE 23 | EXAMPLE 24 | EXAMPLE 25 | EXAMPLE 26 |
|---|---|---|---|---|---|---|---|---|---|
| | | AMOUNT ADDED (PARTS BY WEIGHT) | | | | | | | |
| MONOFUNCTIONAL ACRYLATE | KAYARAD RM-1001 (NIPPON KAYAKU CO., LTD.) | | | | | | | | |
| | IBXA (OSAKA ORGANIC CHEMICAL INDUSTRY LTD.) | | | | | | | | |
| | KAYARAD R-128H (NIPPON KAYAKU CO., LTD.) | | | | | | | | |
| | PHE-2D (DKS CO., LTD.) | | | | | | | | |
| BIFUNCTIONAL ACRYLATE | KAYARAD HX-220 (NIPPON KAYAKU CO., LTD.) | | | | | | | | |
| | KAYARAD R-167 (NIPPON KAYAKU CO., LTD.) | | | | | | | | |
| | KAYARAD R-664 (NIPPON KAYAKU CO., LTD.) | | | | | | | | |
| BIFUNCTIONAL URETHANE ACRYLATE | KAYARAD UX-3204 (NIPPON KAYAKU CO., LTD.) | | | | | | | | |
| BIFUNCTIONAL EPOXY ACRYLATE | KAYARAD R-115 (NIPPON KAYAKU CO., LTD.) | 80 | 60 | 40 | 20 | | 43 | | |
| TRIFUNCTIONAL ACRYLATE | KAYARAD PET 30 (NIPPON KAYAKU CO., LTD.) | | | | | | 14 | | |
| SIX-FUNCTIONAL ACRYLATE | KAYARAD DPCA-20 (NIPPON KAYAKU CO., LTD.) | | | | | | | 100 | |
| FIVE-FUNCTIONAL ACRYLATE | KAYARAD D-310 (NIPPON KAYAKU CO., LTD.) | | | | | | | | 100 |

TABLE 9-continued

COMPOSITION TABLE OF COATING LIQUID FOR FORMING BLOCK LAYER IN EXAMPLES 4 TO 26

| | | | | | | | | | | |
|---|---|---|---|---|---|---|---|---|---|---|
| SIX-FUNCTIONAL URETHANE ACRYLATE | KAYARAD UX-5000 (NIPPON KAYAKU CO., LTD.) | 20 | 40 | 60 | 80 | 100 | 43 | | | |
| PHOTOPOLY-MERIZATION INITIATOR | Irgacure 907 (BASF LTD.) | | 5 | 5 | 5 | 5 | 5 | 5 | 5 | 5 |
| | DAROCUR TPO (BASF LTD.) | | 1 | 1 | 1 | 1 | 1 | 1 | 1 | 1 |
| SOLVENT | METHYLETHYL-KETONE | | 100 | 100 | 100 | 100 | 100 | 100 | 100 | 100 |

TABLE 10

COMPOSITION TABLE OF COATING LIQUID FOR FORMING BLOCK LAYER IN EXAMPLES 27 TO 34

| MATERIAL (KIND) | MATERIAL NAME (MANUFACTURER) | Tg OF HOMO-POLYMER (CATALOG REFERENCE) | COMPATIBILITY WITH WATER | EXAMPLE 27 | EXAMPLE 28 | EXAMPLE 29 | EXAMPLE 30 |
|---|---|---|---|---|---|---|---|
| | | | | AMOUNT ADDED (PARTS BY WEIGHT) | | | |
| POLYESTER RESIN | VYLON 240 (TOYOBO CO., LTD.) | 60° C. | WATER INSOLUBILITY | 100 | | | |
| POLYAMIDE RESIN | KAYAFLEX BPAM-01 (NIPPON KAYAKU CO., LTD.) | 200° C. OR MORE | WATER INSOLUBILITY | | 100 | | |
| POLYURETHANE RESIN | UR-1700 (TOYOBO CO., LTD.) | 92° C. | WATER INSOLUBILITY | | | 100 | |
| | UR-3210 (TOYOBO CO., LTD.) | −3° C. | WATER INSOLUBILITY | | | | 100 |
| POLYVINYL-BUTYRAL RESIN | Mowital B20H (KURARAY CO., LTD.) | 64° C. | WATER INSOLUBILITY | | | | |
| | Mowital B60H (KURARAY CO., LTD.) | 70° C. | WATER INSOLUBILITY | | | | |
| POLYVINYL ALCOHOL RESIN | GOHSENOL Z-200 (NIPPON SYNTHETIC CHEMICAL INDUSTRY CO., LTD.) | 80° C. TO 85° C. | WATER SOLUBILITY | | | | |
| ACRYLIC RESIN | PTR-3000 (NIPPON KAYAKU CO., LTD.) | −30° C. | WATER INSOLUBILITY | | | | |
| SOLVENT | METHYLETHYLKETONE | | | 900 | | 400 | 400 |
| | CYCLOPENTANONE | | | | 900 | | |
| | WATER | | | | | | |

| | MATERIAL (KIND) | MATERIAL NAME (MANUFACTURER) | EXAMPLE 31 | EXAMPLE 32 | EXAMPLE 33 | EXAMPLE 34 |
|---|---|---|---|---|---|---|
| | | | AMOUNT ADDED (PARTS BY WEIGHT) | | | |
| | POLYESTER RESIN | VYLON 240 (TOYOBO CO., LTD.) | | | | |
| | POLYAMIDE RESIN | KAYAFLEX BPAM-01 (NIPPON KAYAKU CO., LTD.) | | | | |
| | POLYURETHANE RESIN | UR-1700 (TOYOBO CO., LTD.) | | | | |
| | | UR-3210 (TOYOBO CO., LTD.) | | | | |
| | POLYVINYL-BUTYRAL RESIN | Mowital B20H (KURARAY CO., LTD.) | 100 | | | |
| | | Mowital B60H (KURARAY CO., LTD.) | | 100 | | |
| | POLYVINYL ALCOHOL RESIN | GOHSENOL Z-200 (NIPPON SYNTHETIC CHEMICAL INDUSTRY CO., LTD.) | | | 100 | |
| | ACRYLIC RESIN | PTR-3000 (NIPPON KAYAKU CO., LTD.) | | | | 100 |
| | SOLVENT | METHYLETHYLKETONE | 400 | 900 | | 900 |
| | | CYCLOPENTANONE | | | | |
| | | WATER | | | 900 | |

<Production of Optical Film>

Two pieces of polyvinylbutyral intermediate films which were transparent with a thickness of 0.38 mm, and contained triethylene glycol-di-2-ethylhexanoate as a plasticizer were used, the aforementioned light reflection film was arranged between the polyvinylbutyral films, and then, they were pressurized and crimped by a laminator so as to obtain an optical film.

<Production of Functional Glass>

The aforementioned optical film was arranged between two pieces of the glass plates each having a thickness of 2 mm and then, they were pressurized/heated so as to obtain the functional glass. First, on the transparent glass plate, the aforementioned optical film and the transparent glass plate were laminated. Subsequently, an excess portion of the optical film protruding from an edge portion of the glass plate was cut out/removed. This was wrapped with a rubber bag and deaerated for 10 minutes in an autoclave heated to 90° C., and preliminarily bonded. This was cooled to a room temperature and then, taken out of the rubber bag and was heated/pressurized again for 30 minutes in the autoclave at 135° C. under a high pressure of 12 kg/cm$^2$, and a functional glass into which the aforementioned optical film having a favorable appearance was inserted was produced.

Comparative Example 2

The laminated glass was produced by the method similar to that in Example 4 except that the block layer was not formed on the surface of the light reflection layer.

Example 35

The laminated glass was produced by the method similar to that in Example 4 except that a TAC film (80 μm) was used for the plastic substrate, and the block layer was formed on the surface of the light reflection layer by using the coating liquid used in Example 24.

Comparative Example 3

The functional glass was produced by the method similar to that in Example 35 except that the TAC film of the light reflection layer produced in Example 35 was peeled off.

<Durability Evaluation of Light Reflection Film>

Initial maximum reflectance and the center reflection wavelength λ2 of the functional glass produced in each of Examples 4 to 35 and Comparative Example 2 and 3 were measured by the spectrophotometer MPC-3100 manufactured by Shimadzu Corporation. After that, each laminated glass was placed in an oven, left for 500 hours under a high-temperature atmosphere at 100° C. and the maximum reflectance and the center reflection wavelength λ2 after the heat-resistance test were measured. A change value of the maximum reflectance and a change value of the center reflection wavelength λ2 after the heat-resistance test were calculated on the basis of each measured value. The results were as shown in Table 11 and Table 12.

From the results in Table 11 and Table 12, the functional glass in Examples 4 to 35 constituting the optical film in which the block layer is provided between the PVB intermediate film and the light reflection layer has lowered values of the maximum reflectance and the change values of the center reflection wavelength λ2 after the heat-resistance test smaller than those of the functional glass in Comparative Example 2 which has a constitution in which the block layer is not provided on the cholesteric liquid crystal layer of the light reflection layer and the functional glass in Comparative Example 3 which has a constitution in which the plastic substrate for avoiding direct contact with the intermediate film is not provided on the light reflection layer. From this fact, it is known that the functional glass having the light reflection film produced in Examples 4 to 34 having the block layer and the functional glass in Example 35 in which the plastic substrate is provided between the light reflection layer and the intermediate film have the maximum reflectance and changes in the center reflection wavelength λ2 under the high temperature atmosphere suppressed as compared with the functional glasses in Comparative Examples 2 and 3 in which the intermediate film is in direct contact with the cholesteric liquid crystal layer of the light reflection layer. Particularly, in Examples 4, 10, 18 to 26, 28, 33, and 35, suppression on the maximum reflectance and changes in the center reflection wavelength λ2 under the high temperature atmosphere were remarkable. From this fact, as the material of the block layer, a water-soluble resin, a resin having relatively high Tg at 100° C. or more, and acrylate having three or more (meth)acryloyl groups in a molecule have an extremely excellent durability improvement effect of the block layer.

TABLE 11

| DURABILITY EVALUATION RESULT OF LIGHT REFLECTION FILM FABRICATED IN EXAMPLES 4 TO 26 | | | | | | | | | |
|---|---|---|---|---|---|---|---|---|---|
| | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 |
| INITIAL VALUE (%) OF MAXIMUM REFLECTANCE | 16.8 | 22.1 | 20.9 | 20.9 | 21.6 | 22.0 | 21.6 | 21.6 | 20.1 |
| MAXIMUM REFLECTAMCE (%) AFTER HEAT-RESISTANCE TEST | 17.3 | 20.0 | 18.6 | 20.4 | 21.4 | 21.6 | 21.6 | 18.5 | 19.2 |
| CHANGE VALUE (%) OF MAXIMUM REFLECTANCE AFTER HEAT-RESISTANCE TEST | −0.5 | 2.1 | 2.4 | 0.5 | 0.2 | 0.5 | 0.0 | 3.1 | 1.0 |
| INITIAL CENTER REFLECTION WAVELENGTH λ2 (nm) | 574 | 568 | 567 | 567 | 566 | 569 | 569 | 567 | 571 |
| CENTER REFLECTION WAVELENGTH λ2 (nm) AFTER HEAT-RESISTANCE TEST | 558 | 516 | 509 | 525 | 534 | 527 | 566 | 503 | 514 |
| CHANGE VALUE (nm) OF CENTER REFLECTION WAVELENGTH λ2 AFTER HEAT-RESISTANCE TEST | 17 | 52 | 58 | 43 | 32 | 42 | 3 | 64 | 58 |
| | EXAMPLE 13 | EXAMPLE 14 | EXAMPLE 15 | EXAMPLE 16 | EXAMPLE 17 | EXAMPLE 18 | EXAMPLE 19 | | |
| INITIAL VALUE (%) OF MAXIMUM REFLECTANCE | 18.2 | 17.2 | 21.3 | 21.6 | 21.7 | 21.8 | 21.5 | | |
| MAXIMUM REFLECTAMCE (%) AFTER HEAT-RESISTANCE TEST | 17.4 | 17.7 | 20.2 | 21.0 | 21.0 | 21.1 | 20.7 | | |

TABLE 11-continued

DURABILITY EVALUATION RESULT OF LIGHT REFLECTION FILM FABRICATED IN EXAMPLES 4 TO 26

| | | | | | | | |
|---|---|---|---|---|---|---|---|
| CHANGE VALUE (%) OF MAXIMUM REFLECTANCE AFTER HEAT-RESISTANCE TEST | 0.7 | −0.5 | 1.1 | 0.5 | 0.7 | 0.7 | 0.8 |
| INITIAL CENTER REFLECTION WAVELENGTH λ2 (nm) | 573 | 573 | 567 | 569 | 569 | 570 | 569 |
| CENTER REFLECTION WAVELENGTH λ2 (nm) AFTER HEAT-RESISTANCE TEST | 497 | 523 | 524 | 531 | 529 | 559 | 566 |
| CHANGE VALUE (nm) OF CENTER REFLECTION WAVELENGTH λ2 AFTER HEAT-RESISTANCE TEST | 77 | 50 | 43 | 38 | 41 | 11 | 3 |

| | EXAMPLE 20 | EXAMPLE 21 | EXAMPLE 22 | EXAMPLE 23 | EXAMPLE 24 | EXAMPLE 25 | EXAMPLE 26 |
|---|---|---|---|---|---|---|---|
| INITIAL VALUE (%) OF MAXIMUM REFLECTANCE | 21.8 | 21.5 | 21.8 | 21.6 | 21.9 | 22.0 | 22.0 |
| MAXIMUM REFLECTAMCE (%) AFTER HEAT-RESISTANCE TEST | 21.0 | 20.9 | 21.2 | 21.3 | 21.1 | 22.0 | 22.0 |
| CHANGE VALUE (%) OF MAXIMUM REFLECTANCE AFTER HEAT-RESISTANCE TEST | 0.7 | 0.6 | 0.6 | 0.3 | 0.8 | 0.0 | 0.0 |
| INITIAL CENTER REFLECTION WAVELENGTH λ2 (nm) | 569 | 569 | 570 | 570 | 572 | 567 | 567 |
| CENTER REFLECTION WAVELENGTH λ2 (nm) AFTER HEAT-RESISTANCE TEST | 568 | 566 | 568 | 567 | 571 | 565 | 565 |
| CHANGE VALUE (nm) OF CENTER REFLECTION WAVELENGTH λ2 AFTER HEAT-RESISTANCE TEST | 2 | 3 | 2 | 4 | 1 | 2 | 2 |

TABLE 12

DURABILITY EVALUATION RESULT OF LIGHT REFLECTION FILM PRODUCED IN EXAMPLES 27 TO 35 AND COMPARATIVE EXAMPLES 1 TO 2

| | EXAMPLE 27 | EXAMPLE 28 | EXAMPLE 29 | EXAMPLE 30 | EXAMPLE 31 | EXAMPLE 32 |
|---|---|---|---|---|---|---|
| INITIAL VALUE (%) OF MAXIMUM REFLECTANCE | 21.7 | 21.6 | 21.9 | 22.3 | 22.0 | 22.1 |
| MAXIMUM REFLECTANCE (%) AFTER HEAT-RESISTANCE TEST | 17.6 | 21.6 | 21.2 | 17.3 | 17.6 | 17.3 |
| CHANGE VALUE (%) OF MAXIMUM REFLECTANCE AFTER HEAT-RESISTANCE TEST | 4.1 | 0.1 | 0.7 | 5.0 | 4.3 | 4.7 |
| INITIAL CENTER REFLECTION WAVELENGTH λ2 (nm) | 563 | 562 | 565 | 565 | 565 | 563 |
| CENTER REFLECTION WAVELENGTH λ2 (nm) AFTER HEAT-RESISTANCE TEST | 504 | 555 | 525 | 485 | 483 | 492 |
| CHANGE VALUE (nm) OF CENTER REFLECTION WAVELENGTH λ2 AFTER HEAT-RESISTANCE TEST | 59 | 7 | 41 | 80 | 82 | 71 |

| | EXAMPLE 33 | EXAMPLE 34 | EXAMPLE 35 | COMPARATIVE EXAMPLE 1 | COMPARATIVE EXAMPLE 2 |
|---|---|---|---|---|---|
| INITIAL VALUE (%) OF MAXIMUM REFLECTANCE | 22.0 | 22.5 | 20.3 | 22.0 | 21.8 |
| MAXIMUM REFLECTANCE (%) AFTER HEAT-RESISTANCE TEST | 20.3 | 19.9 | 19.8 | 16.7 | 16.2 |
| CHANGE VALUE (%) OF MAXIMUM REFLECTANCE AFTER HEAT-RESISTANCE TEST | 1.7 | 2.6 | 0.5 | 5.3 | 5.6 |
| INITIAL CENTER REFLECTION WAVELENGTH λ2 (nm) | 570 | 561 | 571 | 567 | 561 |
| CENTER REFLECTION WAVELENGTH λ2 (nm) AFTER HEAT-RESISTANCE TEST | 568 | 480 | 562 | 484 | 480 |
| CHANGE VALUE (nm) OF CENTER REFLECTION WAVELENGTH λ2 AFTER HEAT-RESISTANCE TEST | 2 | 81 | 9 | 84 | 81 |

The light reflection film of the present disclosure and the functional glass produced by using the light reflection film are excellent in durability. Thus, even if the functional glass including the reflection film according to the present disclosure as the display for the HUDs is placed under a severe environment, the projected image can be continuously projected brightly and clearly.

What is claimed is:

1. An optical laminate structure comprising a light control laminate having at least one light reflection layer, a first quarter wave plate laminated on one of surfaces of the light reflection layer, and a second quarter wave plate laminated on another surface of the light reflection layer;
   the light reflection layer including a right-handed circularly polarized light reflection layer or a left-handed circularly polarized light reflection layer; and
   an angle formed by a polarization axis of S-polarized light or P-polarized light incident from a position inclined from an axis perpendicular to a surface of the light control laminate by 45° or more and 65° or less and a slow axis of the first quarter wave plate on a side to which the S-polarized light or P-polarized light being incident being within a range of 5° to θ, in which θ is an angle satisfying the following formulas (1) and (2):

$$\tan\theta = \cos\beta \quad (1)$$

$$\beta = \sin^{-1}\left(\sin\alpha \cdot \frac{n_\alpha}{n_\beta}\right) \quad (2)$$

θ: an angle formed by the slow axis of the first quarter wave plate and the polarization axis of S-polarized light or P-polarized light incident to the light control laminate at an arbitrary incident angle α

α: an incident angle of S-polarized light or P-polarized light to the light control laminate $n_\alpha$: refractive index of air $n_\beta$: refractive index of the first quarter wave plate.

2. The optical laminate structure according to claim 1, wherein
an angle θ formed by the slow axis of the first quarter wave plate and the polarization axis of S-polarized light or P-polarized light incident to the light control laminate at an arbitrary incident angle satisfies formulas (1) and (2); and
an angle formed by the slow axis of the second quarter wave plate and the polarization axis of S-polarized light or P-polarized light incident to the light control laminate at an arbitrary incident angle is −θ.

3. The optical laminate structure according to claim 1, wherein at least one of the first quarter wave plate and second quarter wave plate includes a polymerizable liquid crystal layer.

4. The optical laminate structure according to claim 1, wherein the at least one of the right-handed circularly polarized light reflection layer and the left-handed circularly polarized light reflection layer is a cholesteric liquid crystal layer having fixed helical orientation.

5. The optical laminate structure according to claim 4, wherein
at least two or more light reflection layers having the cholesteric liquid crystal layer and having center reflection wavelengths different from each other are laminated;
the at least two or more light reflection layers which are laminated include at least one light reflection layer among a light reflection layer PRL-1 having a center reflection wavelength of 400 nm or more and less than 500 nm and having reflectance to ordinary light at the center reflection wavelength of 5% or more and 25% or less, a light reflection layer PRL-2 having a center reflection wavelength of 500 nm or more and less than 600 nm and having reflectance to ordinary light at the center reflection wavelength of 5% or more and 25% or less, and a light reflection layer PRL-3 having a center reflection wavelength of 600 nm or more and less than 700 nm and having reflectance to ordinary light at the center reflection wavelength of 5% or more and 25% or less; and
each of the at least two or more light reflection layers has a characteristic of reflecting polarized light in the same direction.

6. The optical laminate structure according to claim 5, wherein the at least two or more light reflection layers include two or three light reflection layers among the light reflection layer PRL-1, the light reflection layer PRL-2, and the light reflection layer PRL-3.

7. The optical laminate structure according to claim 5, wherein
the at least two or more light reflection layers include a light reflection layer PRL-4 having a center reflection wavelength of 700 nm or more and 950 nm or less and having reflectance to ordinary light at the center reflection wavelength of 5% or more and 25% or less; and
the light reflection layer PRL-4 has a characteristic of reflecting polarized light in the same direction as the light reflection layer PRL-1, the light reflection layer PRL-2, and the light reflection layer PRL-3.

8. The optical laminate structure according to claim 4, wherein a full width at half maximum of a reflection spectrum of each of the light reflection layers is 100 nm or more and 500 nm or less.

9. The optical laminate structure according to claim 4, wherein an angle formed by the slow axis of the first quarter wave plate and the polarization axis of S-polarized light or P-polarized light incident to the light control laminate at an arbitrary incident angle is within a range from 5° to θ, and an angle formed by the slow axis of the second quarter wave plate and the polarization axis of S-polarized light or P-polarized light incident to the light control laminate at an arbitrary incident angle is within a range from −θ to −5°.

10. The optical laminate structure according to claim 1, wherein the light control laminate includes an optical laminate in which a block layer is laminated on one surface or both surfaces of the light reflection layer.

11. The optical laminate structure according to claim 10, wherein a material for forming the block layer is a resin having a glass transition temperature of 80° C. or more and 300° C. or less.

12. The optical laminate structure according to claim 10, wherein the block layer is a cured film obtained by curing an ultraviolet curable resin composition, thermally curable resin composition or a mixture of them.

13. The optical laminate structure according to claim 12, wherein the ultraviolet curable resin composition includes one or more of ultraviolet curable resins selected from a group consisting of polyfunctional (meth)acrylate, polyfunctional urethane (meth)acrylate, polyfunctional epoxy (meth)acrylate, polyfunctional polyester (meth)acrylate, and polyfunctional tris (acryloxyethyl) isocyanurate.

14. The optical laminate structure according to claim 1, wherein the light control laminate is a laminate for laminated glass made by laminating at least one intermediate film.

15. The optical laminate structure according to claim 14, wherein the light control laminate is the laminate for laminated glass in which two pieces of the intermediate films are laminated so as to sandwich the first quarter wave plate and the second quarter wave plate.

16. The optical laminate structure according to claim 14, wherein at least one of the intermediate films is a polyvinyl butyral resin.

17. The optical laminate structure according to claim 1, wherein the light control laminate is a functional glass in which the first quarter wave plate and the second quarter wave plate are sandwiched by two pieces of glass plates.

18. A head-up display system containing the optical laminate structure according to claim 1 and a display projecting display light showing a display image as S-polarized light or P-polarized light.

19. The head-up display system according to claim 18, wherein
the display light projected from the display is P-polarized light; and
an incident angle of the P-polarized light incident to the optical laminate structure is within a range from α−10° to α+10°, where α is a Brewster's angle of the P-polarized light to the optical laminate structure.

20. The optical laminate structure according to claim 1, wherein θ is less than 45°.

\* \* \* \* \*